(12) United States Patent
Wang et al.

(10) Patent No.: US 12,576,781 B2
(45) Date of Patent: Mar. 17, 2026

(54) LIGHT SYSTEM CONTROL METHOD, LIGHT SYSTEM, AND VEHICLE

(71) Applicant: Shenzhen Yinwang Intelligent Technologies Co., Ltd., Shenzhen (CN)

(72) Inventors: Peizhi Wang, Shanghai (CN); Yi Wang, Shanghai (CN); Minghui Zheng, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 117 days.

(21) Appl. No.: 18/524,886

(22) Filed: Nov. 30, 2023

(65) Prior Publication Data

US 2024/0166127 A1 May 23, 2024

Related U.S. Application Data

(63) Continuation of application No. PCT/CN2021/097067, filed on May 30, 2021.

(51) Int. Cl.
| | |
|---|---|
| *B60Q 3/80* | (2017.01) |
| *B60G 3/18* | (2006.01) |
| *B60Q 3/18* | (2017.01) |
| *B60Q 3/225* | (2017.01) |
| *G06F 3/16* | (2006.01) |
| *H05B 47/105* | (2020.01) |

(52) U.S. Cl.
CPC ................ *B60Q 3/80* (2017.02); *B60G 3/18* (2013.01); *B60Q 3/229* (2022.05); *G06F*

*3/167* (2013.01); *H05B 47/105* (2020.01); *B60Q 2500/30* (2022.05)

(58) Field of Classification Search
CPC ...... B60K 2360/33–48; B60Q 1/32–44; B60Q 1/507; B60Q 3/10–18; B60Q 3/217–283; B60Q 3/50–88; B60Q 2500/20–30; B60Q 2900/30–40; G06F 3/167; G08C 23/02; G08C 2201/31; H04Q 9/00; H05B 47/105; Y02B 20/40
See application file for complete search history.

(56) References Cited

U.S. PATENT DOCUMENTS

| | | | |
|---|---|---|---|
| 7,344,277 B2 * | 3/2008 | Anderson, Jr. | .... B60H 1/00985 236/94 |
| 9,434,300 B2 * | 9/2016 | Pasdar | .................... B60Q 3/85 |
| 9,707,708 B2 * | 7/2017 | Bozio | .................... B60Q 3/229 |
| 10,112,528 B1 | 10/2018 | Mazuir et al. | |

(Continued)

FOREIGN PATENT DOCUMENTS

| | | |
|---|---|---|
| CN | 107985194 A | 5/2018 |
| CN | 207790472 U | 8/2018 |

(Continued)

*Primary Examiner* — Jason M Han
(74) *Attorney, Agent, or Firm* — Conley Rose, P.C.

(57) ABSTRACT

A vehicle includes a plurality of areas, each of the plurality of areas includes at least one light emitting apparatus and at least one sensor of a first type, the plurality of areas include a first area, the first area includes a first light emitting apparatus and a first sensor, and a type of the first sensor is the first type. A light system control method includes: obtaining a first signal collected by the first sensor; and controlling, based on the first signal, the first light emitting apparatus to work.

20 Claims, 17 Drawing Sheets

(56) References Cited

U.S. PATENT DOCUMENTS

| | | | |
|---|---|---|---|
| 11,057,978 B2 * | 7/2021 | Hiramatsu | H05B 47/11 |
| 2009/0093206 A1 | 4/2009 | Okita et al. | |
| 2013/0342104 A1 | 12/2013 | Mayer et al. | |
| 2017/0217364 A1 | 8/2017 | Noboritate et al. | |
| 2017/0270924 A1 | 9/2017 | Fleurence et al. | |
| 2018/0181365 A1 | 6/2018 | Winton et al. | |
| 2021/0354642 A1 | 11/2021 | Onodera et al. | |

FOREIGN PATENT DOCUMENTS

| | | |
|---|---|---|
| CN | 108528329 A | 9/2018 |
| CN | 109121254 A | 1/2019 |
| CN | 109849755 A | 6/2019 |
| CN | 110053551 A | 7/2019 |
| CN | 110211585 A | 9/2019 |
| CN | 110562126 A | 12/2019 |
| CN | 209756929 U | 12/2019 |
| CN | 110949248 A | 4/2020 |
| CN | 111132421 A | 5/2020 |
| CN | 111782052 A | 10/2020 |
| CN | 212677409 U | 3/2021 |
| DE | 202014004086 U1 | 6/2014 |
| DE | 102016000545 A1 | 1/2017 |
| DE | 102018130301 A1 | 6/2020 |
| EP | 3725591 A1 | 10/2020 |
| FR | 3010016 A1 | 3/2015 |
| FR | 3047942 A1 | 8/2017 |
| JP | 5308020 B2 | 10/2013 |
| JP | 2017171287 A | 9/2017 |
| JP | 2020509527 A | 3/2020 |
| JP | 2020196294 A | 12/2020 |
| JP | 2021005470 A | 1/2021 |
| KR | 101421929 B1 | 7/2014 |
| KR | 20140140278 A | 12/2014 |
| WO | 2020157991 A1 | 8/2020 |

* cited by examiner

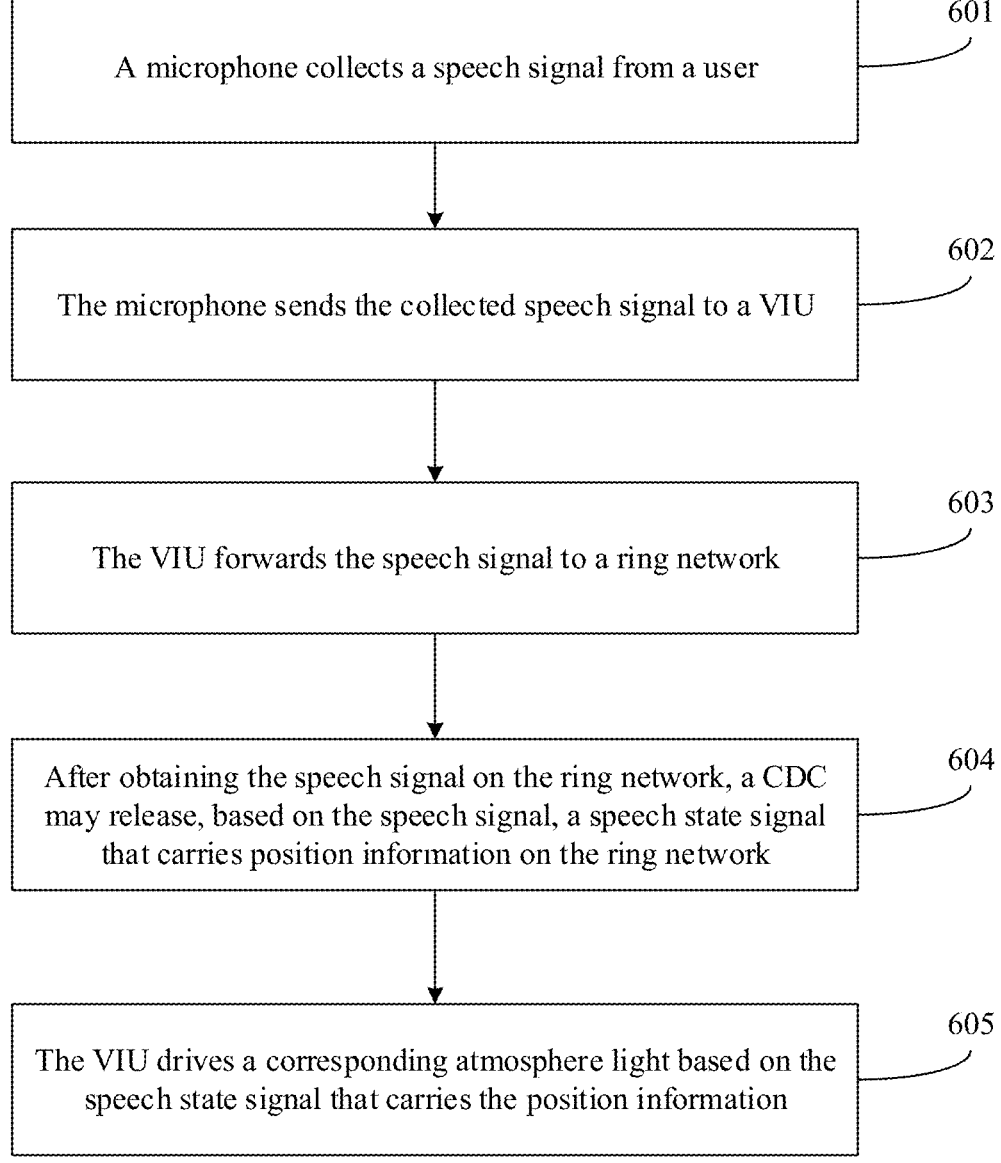

| | |
|---|---|
| A microphone collects a speech signal from a user | 601 |
| The microphone sends the collected speech signal to a VIU | 602 |
| The VIU forwards the speech signal to a ring network | 603 |
| After obtaining the speech signal on the ring network, a CDC may release, based on the speech signal, a speech state signal that carries position information on the ring network | 604 |
| The VIU drives a corresponding atmosphere light based on the speech state signal that carries the position information | 605 |

FIG. 6

Current in-vehicle temperature $T_4$
Adjusted temperature T after
adjustment by a user inside a vehicle Determine whether
T is greater than $T_4$ Yes No A temperature heats up and a color
turns red
A higher temperature indicates a
darker red color A temperature cools down and a
color turns blue
A lower temperature indicates a
darker blue color Indicate a temperature change of liquid in a
cup by using a cup holder atmosphere light

| Vehicle turn intent | Monitoring a vehicle approaching from behind |
|---|---|

VIU or interior light controller

| If there is a vehicle in a left-side blind spot, execute a lighting signal in the left-side blind spot | If there is a vehicle in a right-side blind spot, execute a lighting signal in the right-side blind spot |
|---|---|

When an atmosphere light on a vehicle door turns on, it indicates that a pedestrian or vehicle passes by After the pedestrian or vehicle passes by, the atmosphere light on the door turns off

LIGHT SYSTEM CONTROL METHOD, LIGHT SYSTEM, AND VEHICLE

CROSS-REFERENCE TO RELATED APPLICATIONS

This is a continuation of Int'l Patent App. No. PCT/CN2021/097067, filed on May 30, 2021, which is incorporated by reference.

FIELD

This disclosure relates to the automotive field, and more specifically, to a light system control method, a light system, and a vehicle.

BACKGROUND

Currently, decorative lights on a vehicle mainly include an interior ambient light. An ambient light, also referred to as ambient lighting, usually occurs at a steering wheel, a center console, a puddle light, a cup holder, a roof, a courtesy light, a courtesy pedal, a vehicle door, a rear trunk, and a vehicle light of a vehicle. The ambient light is mainly represented in a single color, multiple colors, a breathing rhythm, a music rhythm, and the like. A satisfied ambient light gives people domestic warmness and comfort and a sense of technological beauty and luxury. In recent years, the ambient light, as a product for vehicle decoration and atmosphere creation, is gradually popularized from premium vehicle to middle-class vehicle.

In recent years, an exterior decorative light is also popular among vehicles, and the exterior decorative light may usually include an indicator light, a brake light, a fog light, an illuminating light, a side marker light, a vehicle dome light, a plate illuminating device, a chassis light, a wheel light, and the like.

Currently, a decorative light on a vehicle, as a product for vehicle decoration and atmosphere creation, can only function in creating a vehicle environment atmosphere, which leads to poor user experience.

SUMMARY

This disclosure provides a light system control method, a light system, and a vehicle, to help improve intelligence of an in-vehicle light system, thereby helping improve user experience.

According to a first aspect, an interior light control method is provided. The method is applied to a vehicle, the vehicle includes a plurality of areas, each of the plurality of areas includes at least one light emitting apparatus and at least one sensor of a first type, the plurality of areas include a first area, the first area includes a first light emitting apparatus and a first sensor, a type of the first sensor is the first type, and the method includes: obtaining a first signal collected by the first sensor; and controlling, based on the first signal, the first light emitting apparatus to work.

In an embodiment, the vehicle can control, based on the first signal collected by the sensor located in the first area, the interior light in the first area to work. This fully considers feelings of members in different areas of the vehicle, and helps improve intelligence of an in-vehicle light system, thereby helping improve user experience.

In some possible implementations, a plurality of interior lights may include an exterior decorative light, an interior ambient light, a spot light, or an LED light.

In some possible implementations, the plurality of areas (for example, four areas) include at least two areas, and each of the at least two areas includes the at least one light emitting apparatus and the at least one sensor of the first type. For example, the vehicle may be divided into a driver area, a front passenger area, a second-row left-side area, and a second-row right-side area. The light emitting apparatus and the sensor of the first type may be disposed in all the four areas, or the light emitting apparatus and the sensor of the first type may be disposed in two of the four areas.

In some possible implementations, the plurality of areas may be divided into a front-row area and a back-row area, and each of the front-row area and the back-row area may include the at least one light emitting apparatus and the at least one sensor of the first type.

In some possible implementations, the plurality of areas of a seven-seat SUV may be divided into a front-row area, a middle-row area, and a back-row area, and each of the front-row area, the middle-row area, and the back-row area may include the at least one light emitting apparatus and the at least one sensor of the first type.

With reference to the first aspect, in some implementations of the first aspect, the controlling, based on the first signal, the first light emitting apparatus to work includes: adjusting an ambient light based on a sound, where the sound includes one or more of a user voice instruction, music played in the vehicle, and a sound made when a video is played in the vehicle.

In an embodiment, the ambient light in the first area is adjusted based on the collected sound made in the first area. The ambient light can provide a sense of ritual of face-to-face communication for a user, and a user can quickly understand and determine, based on a change of the light in the vehicle, an area in which a voice assistant selects to communicate with the user. This can fully consider feelings of members in the vehicle, and improve voice communication human-machine experience.

With reference to the first aspect, in some implementations of the first aspect, the sensor of the first type is a sound source positioning apparatus, and the first signal includes a sound signal and information about a sound source position; and the controlling, based on the first signal, the first light emitting apparatus to work includes: when the sound source position is located in the first area, controlling the first light emitting apparatus to work.

In an embodiment, the vehicle can determine, in a timely manner by using the first sensor located in the first area, the area in which the voice assistant communicates with the user. The light emitting apparatus can provide the sense of ritual of face-to-face communication for the user, and the user can quickly understand and determine, based on the change of the light emitting apparatus, the area in which the voice assistant selects to communicate with the user. This can fully consider the feelings of the members in the vehicle, and improve the voice communication human-machine experience.

In some possible implementations, the first sensor may be a microphone array.

With reference to the first aspect, in some implementations of the first aspect, the sensor of the first type is a sound collection apparatus, the plurality of areas further include a second area, the second area includes a second sensor, a type of the second sensor is the first type, and before the controlling, based on the first signal, the first light emitting apparatus to work, the method further includes: obtaining a second signal collected by the second sensor; and the controlling, based on the first signal, the first light emitting apparatus to work includes: when determining, based on the first signal and the second signal, that a sound source is located in the first area, controlling the first light emitting apparatus to work.

In an embodiment, the vehicle can determine, in a timely manner by using a plurality of sensors located in different areas, the area in which the voice assistant communicates with the user. The light emitting apparatus can provide the sense of ritual of face-to-face communication for the user, and the user can quickly understand and determine, based on the change of the light emitting apparatus, the area in which the voice assistant selects to communicate with the user. This can fully consider the feelings of the members in the vehicle, and improve the voice communication human-machine experience.

In some possible implementations, the first sensor and the second sensor may be microphones.

In some possible implementations, the determining, based on the first signal and the second signal, that a user is located in the first area includes: determining, based on signal strength of the first signal and signal strength of the second signal, that the user is located in the first area.

With reference to the first aspect, in some implementations of the first aspect, before the controlling the first light emitting apparatus to work, the method further includes: determining a speech recognition state based on the first signal; and the controlling the first light emitting apparatus to work includes: controlling, based on the speech recognition state, the first light emitting apparatus to work, where the speech recognition state includes one or more of a speech wakeup state, a speech listening state, a speech thinking state, and a speech execution state.

In an embodiment, the vehicle can determine the speech recognition state based on the collected first signal, and different speech recognition states can correspond to different working modes of the light emitting apparatus. In this way, in different speech recognition states, the user can determine, based on the change of the light emitting apparatus, the current speech recognition state of the voice assistant, thereby helping improve man-machine communication experience.

With reference to the first aspect, in some implementations of the first aspect, the speech recognition state includes one or more of a speech wakeup state, a speech listening state, a speech thinking state, and a speech execution state.

With reference to the first aspect, in some implementations of the first aspect, the sensor of the first type is a sound collection apparatus, and the obtaining a first signal collected by the first sensor in the first area includes: obtaining an audio signal collected by the first sensor; and the controlling, based on the first signal, the first light emitting apparatus to work includes: controlling, based on a first parameter of the audio signal, the first light emitting apparatus to work.

In an embodiment, the vehicle can control, based on the parameter of the audio signal, the first light emitting apparatus to work. In this way, the first light emitting apparatus can change with the parameter, and create a different atmosphere for the user, thereby helping improve user experience.

With reference to the first aspect, in some implementations of the first aspect, the audio signal is music, and the first parameter includes one or more of a beat, a tune, lyric information, and album cover color information of the music.

With reference to the first aspect, in some implementations of the first aspect, the audio signal is music, and the controlling, based on the first signal, the first light emitting apparatus to work includes: determining first information of the music based on the first parameter of the audio signal, where the first information includes one or more of a song name, a singer name, or a name of an album to which the music belongs; and controlling, based on a mapping relationship between the first information and a working mode of the light emitting apparatus, the first light emitting apparatus to work in a second mode.

In an embodiment, the vehicle can determine the working mode of the first light emitting apparatus based on the correspondence between the first information of the music and the working mode of the light emitting apparatus. In this way, music preferred by the user and the working mode of the light emitting apparatus can be combined, thereby helping improve user experience.

With reference to the first aspect, in some implementations of the first aspect, the sensor includes a temperature sensor, the first signal indicates a first temperature value, and the controlling, based on the first signal, the first light emitting apparatus to work includes: when the first temperature value is greater than a preset temperature value or when the first temperature value is less than a preset temperature value, controlling the first light emitting apparatus to work.

In an embodiment, when the temperature of the first area is greater than the preset temperature value or the temperature of the first area is less than the preset temperature value, the vehicle can control the light emitting apparatus to notify the user of a temperature change of the first area, thereby implementing a visual feedback of cool and warm requirements of the user, and helping improve user experience.

In some possible implementations, the sensor includes a temperature sensor, the first signal indicates a first temperature value, and the controlling, based on the first signal, the first light emitting apparatus to work includes: when the first temperature value is greater than a preset temperature value, controlling the first light emitting apparatus to work in a third working mode; or when the first temperature value is less than a preset temperature value, controlling the first light emitting apparatus to work in a fourth working mode, where the third working mode and the fourth working mode are different working modes.

With reference to the first aspect, in some implementations of the first aspect, the controlling the first light emitting apparatus to work includes: when the first temperature value is greater than the preset temperature value, controlling the first light emitting apparatus to display a warm hue; or when the first temperature value is less than the preset temperature value, controlling the first light emitting apparatus to display a cool hue.

In an embodiment, when the temperature value of the first area is greater than the preset temperature value, the light emitting apparatus is controlled to display the warm hue, so that the user can intuitively feel that the temperature of the current area heats up. When the temperature value of the first area is less than the preset temperature value, the light emitting apparatus is controlled to display the cool hue, so that the user can intuitively feel that the temperature of the current area cools down. This is convenient for the user to adjust the temperature of the current area, so that the temperature of the current area is always kept close to a temperature expected by the user.

With reference to the first aspect, in some implementations of the first aspect, the sensor includes a temperature sensor, the first signal indicates a second temperature value, and before the controlling, based on the first signal, a first interior light to work, the method further includes: detecting an operation that a user located in the first area adjusts a temperature in the vehicle to a third temperature value; and the controlling, based on the first signal, the first light emitting apparatus to work includes: when the third temperature value is greater than the second temperature value or when the third temperature value is less than the second temperature value, controlling the first light emitting apparatus to work.

In an embodiment, when the vehicle detects that the user adjusts the temperature of the first area to the third temperature value, if the third temperature value is higher than the current temperature detected by the temperature sensor of the first area or the third temperature value is lower than the current temperature detected by the temperature sensor of the first area, the vehicle can control the change of the light emitting apparatus, so that the user intuitively feels a temperature adjustment intent of the user, thereby implementing the visual feedback of the corresponding user on the cool and warm requirements, and helping improve user experience.

In some possible implementations, the sensor includes a temperature sensor, the first signal indicates a second temperature value, and before the controlling, based on the first signal, the first light emitting apparatus to work, the method further includes: detecting an operation that a user located in the first area adjusts a temperature in the vehicle to a third temperature value; and the controlling, based on the first signal, the first light emitting apparatus to work includes: when the third temperature value is greater than the second temperature value, controlling the first light emitting apparatus to work in a fifth working mode; or when the third temperature value is less than the second temperature value, controlling the first light emitting apparatus to work in a sixth working mode, where the fifth working mode and the sixth working mode are different working modes.

With reference to the first aspect, in some implementations of the first aspect, the controlling the first interior light to work includes: when the third temperature value is greater than the second temperature value, controlling the first light emitting apparatus to display a warm hue; or when the third temperature value is less than the second temperature value, controlling the first light emitting apparatus to display a cool hue.

In an embodiment, when the third temperature value is greater than the second temperature value, the light emitting apparatus is controlled to display the warm hue, so that the user can intuitively feel that the current intent of the user is to heat up the temperature of the first area. When the third temperature value is less than the second temperature value, the light emitting apparatus is controlled to display the cool hue, so that the user can intuitively feel that the current intent of the user is to cool down the temperature of the first area.

With reference to the first aspect, in some implementations of the first aspect, the method further includes: when detecting an operation that a user located in the first area adjusts a temperature in the vehicle to a third temperature value, detecting that an air exhaust direction of an air outlet of an air conditioner located in the first area is a first direction; and the controlling the first light emitting apparatus to work includes: controlling the first light emitting apparatus to be displayed in a water flowing light form, where the water flowing light form matches the first direction.

In an embodiment, the vehicle can further control the light emitting apparatus in the first area to be displayed in the water flowing light form, and the water flowing light form matches the air exhaust direction of the air conditioner. In this way, the user can intuitively feel the air exhaust direction after seeing the water flowing light form, thereby helping improve user experience.

With reference to the first aspect, in some implementations of the first aspect, the sensor includes a cup holder temperature sensor, and the obtaining a first signal collected by the sensor in the first area includes: after detecting that a user places a cup in a cup holder located in the first area, obtaining the first signal collected by the cup holder temperature sensor, where the first signal indicates a fourth temperature value of liquid in the cup; and when the fourth temperature value is greater than a fifth temperature value or when the fourth temperature value is less than a fifth temperature value, controlling the first light emitting apparatus to work, where the fifth temperature is a temperature value of the liquid in the cup that is detected by the cup holder temperature sensor before the user places the cup in the cup holder.

In an embodiment, when the cup holder temperature sensor detects that the temperature of the liquid after the user places the cup is different from the temperature of the liquid before the user places the cup, the temperature change can be displayed by using the change of the light emitting apparatus. This helps the user intuitively feels a change process of the liquid temperature in the cup, thereby helping improve user experience.

With reference to the first aspect, in some implementations of the first aspect, the controlling the first light emitting apparatus to work includes: when the fourth temperature value is greater than the fifth temperature value, controlling the first light emitting apparatus to display a warm hue; or when the fourth temperature value is less than the fifth temperature value, controlling the first light emitting apparatus to display a cool hue.

In an embodiment, when the fourth temperature value is greater than the fifth temperature value, the first light emitting apparatus is controlled to display the warm hue, so that the user can intuitively feel that the temperature in the cup is higher than the temperature before the cup is placed, thereby avoiding a scald caused because the user in the vehicle touches the cup by mistake.

With reference to the first aspect, in some implementations of the first aspect, the method further includes: if the fourth temperature value is greater than the fifth temperature value, in a process in which a temperature detected by the cup holder temperature sensor cools down from the fourth temperature to the fifth temperature, controlling a color of the first light emitting apparatus to change from deep to light; or if the fourth temperature value is less than the fifth temperature value, in a process in which a temperature detected by the cup holder temperature sensor heats up from the fourth temperature to the fifth temperature, controlling a color of the first light emitting apparatus to change from deep to light.

In an embodiment, in a process in which a hot drink cools or a cold drink heats up to a room temperature, the color of the light emitting apparatus may change from deep to light, and gradually restore, along with a temperature change, to a color corresponding to a room temperature. This helps the user intuitively feel a change process of the temperature of the liquid in the cup, thereby helping improve user experience.

With reference to the first aspect, in some implementations of the first aspect, the first light emitting apparatus is a cup holder ambient light.

With reference to the first aspect, in some implementations of the first aspect, the first signal indicates position information of an object around a first vehicle door, and there is a correspondence between the first vehicle door and the first area; and the controlling, based on the first signal, the first light emitting apparatus to work includes: when the vehicle is in a stationary state and the position information of the object meets a preset condition, controlling the first light emitting apparatus to work in a seventh mode.

In an embodiment, when the vehicle is stationary and there is the object passing outside the vehicle, the light emitting apparatus can notify the user that there is the object passing through the vehicle door, thereby preventing the user from colliding with the object after the vehicle door is opened.

With reference to the first aspect, in some implementations of the first aspect, before the controlling the first light emitting apparatus to work in a seventh mode, the method further includes: detecting an operation that the user located in the first area is about to open a vehicle door.

With reference to the first aspect, in some implementations of the first aspect, before the controlling the first light emitting apparatus to work in a seventh mode, the method further includes: detecting that the first area includes the user.

In an embodiment, before controlling the first light emitting apparatus to work, the vehicle can first determine that the user exists in the first area. If no user exists, even if there is the object passing outside the vehicle, the vehicle can control the first light emitting apparatus not to turn on, thereby helping save power.

With reference to the first aspect, in some implementations of the first aspect, the method further includes: when the controlling the first light emitting apparatus to work in a seventh mode, controlling the first vehicle door to be locked.

In an embodiment, when there is the object passing through the vehicle door, the vehicle can further control the vehicle door to be locked, thereby avoiding a collision when the user cannot make a response by using the light emitting apparatus.

With reference to the first aspect, in some implementations of the first aspect, the first light emitting apparatus includes a first interior light and a first exterior light, the seventh working mode includes a first sub-mode and a second sub-mode, and the controlling the first light emitting apparatus to work in a seventh mode includes: controlling the first interior light to work in the first sub-mode, and controlling the first exterior light to work in the second sub-mode.

In an embodiment, the first sub-mode may notify the user inside the vehicle that there is the object passing outside the vehicle, so that the user inside the vehicle can be warned. The second sub-mode may notify the user outside the vehicle that the vehicle door is about to open, so that the user outside the vehicle can avoid in a timely manner. In this way, both passengers inside and outside the vehicle are warned, thereby preventing the user from colliding with the object after the vehicle door is opened.

With reference to the first aspect, in some implementations of the first aspect, before the controlling the first light emitting apparatus to work, the method further includes: obtaining user information of the user located in the first area; and obtaining, based on the user information, light configuration information corresponding to the user information; and the controlling the first light emitting apparatus to work includes: controlling, based on the light configuration information, the first light emitting apparatus to work.

In an embodiment, before controlling the first light emitting apparatus to work, the vehicle can further first determine the user information, and determine the light configuration information based on the user information. The vehicle can store a correspondence between different users and light configuration information preferred by the users. In this way, the vehicle can select the light configuration information preferred by the user to control the light emitting apparatus to work. This is more compliant with a use habit of the user, thereby helping improve use experience of the user.

With reference to the first aspect, in some possible implementations of the first aspect, the first sensor may be a camera, the first signal may be environment information outside the vehicle collected by the camera, and the controlling, based on the first signal, the first light emitting apparatus to work includes: controlling, based on the collected environment information outside the vehicle, the first light emitting apparatus to work.

According to a second aspect, a vehicle light control method is provided. The method is applied to a vehicle, the vehicle includes a plurality of areas, each of the plurality of areas includes at least one light emitting apparatus and at least one sensor of a first type, the plurality of areas include a first area, the first area includes a first light emitting apparatus and a first sensor, a type of the first sensor is the first type, the first light emitting apparatus includes a first interior light and a first exterior light, and the method includes: obtaining a first signal detected by the first sensor; and controlling, based on the first signal, the first interior light and the first exterior light to work.

In an embodiment, the vehicle can control, based on the first signal collected by the sensor located in the first area, the interior light and the exterior light located in the first area to work. This fully considers feelings of members in different areas of the vehicle, helps a user outside the vehicle learn a current state of the vehicle in a timely manner, and helps improve intelligence of the in-vehicle light system, thereby helping improve user experience.

With reference to the second aspect, in some implementations of the second aspect, the first signal indicates that the vehicle is currently in an autonomous driving mode, and the controlling, based on the first signal, the first interior light and the first exterior light to work includes: controlling, based on the first signal, the first interior light to work in a first mode and controlling the first exterior light to work in a second working mode, where the first working mode notifies a user inside the vehicle that the vehicle is currently in the autonomous driving mode, and the second working mode notifies a user outside the vehicle that the vehicle is currently in the autonomous driving mode.

In an embodiment, when the vehicle is in the autonomous driving mode, the user inside the vehicle and the user outside the vehicle can be separately notified by using the interior light and the exterior light. This can warn some users who want to stay away from the autonomous driving vehicle.

With reference to the second aspect, in some implementations of the second aspect, the method further includes: when detecting that the vehicle needs to be taken over by a driver, controlling the first interior light to switch from the first mode to a third mode to work.

In an embodiment, when the vehicle needs to be taken over by the user, the vehicle can control the light emitting apparatus to switch from the first mode to the third mode. In this way, the user inside the vehicle can be warned, so that the user can take over the vehicle in a timely manner, thereby improving driving security of the vehicle.

In some possible implementations, the method further includes: when an autonomous driving level of the vehicle is degraded, controlling the first interior light to switch from the first mode to a third mode to work.

With reference to the second aspect, in some implementations of the second aspect, the method further includes: controlling the first exterior light to stop working in the second mode.

With reference to the second aspect, in some implementations of the second aspect, the first signal indicates position information of an object around a first vehicle door; and the controlling, based on the first signal, the first interior light and the first exterior light to work includes: when the vehicle is in a stationary state and the position information of the object meets a preset condition, controlling the first interior light to work in a third mode and controlling the first exterior light to work in a fourth working mode.

With reference to the second aspect, in some implementations of the second aspect, before the controlling the first interior light to work in a third mode and controlling the first exterior light to work in a fourth working mode, the method further includes: detecting an operation that a user located in a first area is about to open a vehicle door, where there is a correspondence between the first area and the first vehicle door.

With reference to the second aspect, in some implementations of the second aspect, before the controlling the first interior light to work in a third mode and controlling the first exterior light to work in a fourth working mode, the method further includes: detecting that the first area includes the user, where there is a correspondence between the first area and the first vehicle door.

With reference to the second aspect, in some implementations of the second aspect, the method further includes: when controlling the first interior light to work in a third mode and controlling the first exterior light to work in a fourth working mode, controlling the first vehicle door to be locked.

With reference to the second aspect, in some implementations of the second aspect, before the controlling the first interior light to work in a third mode and controlling the first exterior light to work in a fourth working mode, the method further includes: obtaining user information of the user located in the first area, where there is a correspondence between the first area and the first vehicle door; and obtaining, based on the user information, light configuration information corresponding to the user information; and the controlling the first interior light to work in a third mode and controlling the first exterior light to work in a fourth working mode includes: based on the light configuration information, controlling the first interior light to work in the third mode and controlling the first exterior light to work in the fourth working mode.

According to a third aspect, a light system is provided. The system is applied to a vehicle, the vehicle includes a plurality of areas, each of the plurality of areas includes at least one light emitting apparatus and at least one sensor of a first type, the plurality of areas include a first area, the light system includes a first light emitting apparatus and a first sensor located in the first area, a type of the first sensor is the first type, and the light system further includes a controller. The first sensor is configured to collect a first signal; and the controller is configured to control, based on the first signal, the first light emitting apparatus to work.

With reference to the third aspect, in some implementations of the third aspect, the controller is further configured to adjust an ambient light based on a sound, where the sound includes one or more of a user voice instruction, music played in the vehicle, and a sound made when a video is played in the vehicle.

With reference to the third aspect, in some implementations of the third aspect, the sensor of the first type is a sound source positioning apparatus, and the first signal includes a sound signal and information about a sound source position; and the controller is further configured to: when the sound source position is located in the first area, control the first light emitting apparatus to work.

With reference to the third aspect, in some implementations of the third aspect, the sensor of the first type is a sound collection apparatus, the plurality of areas further include a second area, the light system further includes a second sensor located in the second area, a type of the second sensor is the first type, and the second sensor is configured to collect a second signal; and the controller is further configured to: when determining, based on the first signal and the second signal, that a sound source is located in the first area, control the first light emitting apparatus to work.

With reference to the third aspect, in some implementations of the third aspect, the controller is further configured to: before controlling the first light emitting apparatus to work, determine a speech recognition state based on the first signal; and the controller is further configured to control, based on the speech recognition state, the first light emitting apparatus to work, where the speech recognition state includes one or more of a speech wakeup state, a speech listening state, a speech thinking state, and a speech execution state.

With reference to the third aspect, in some implementations of the third aspect, the sensor of the first type is a sound collection apparatus, and the first sensor is further configured to collect an audio signal; and the controller is further configured to control, based on a first parameter of the audio signal, the first light emitting apparatus to work.

With reference to the third aspect, in some implementations of the third aspect, the audio signal is music, and the first parameter includes one or more of a beat, a tune, lyric information, and album cover color information of the music.

With reference to the third aspect, in some implementations of the third aspect, the audio signal is music, and the controller is further configured to: determine first information of the music based on the first parameter of the audio signal, where the first information includes one or more of a song name, a singer name, or a name of an album to which the music belongs; and control, based on a mapping relationship between the first information and a working mode of the light emitting apparatus, the first light emitting apparatus to work in a second mode.

With reference to the third aspect, in some implementations of the third aspect, the sensor includes a temperature sensor, the first signal indicates a first temperature value, and the controller is further configured to: when the first temperature value is greater than a preset temperature value, control the first light emitting apparatus to work in a third working mode; or when the first temperature value is less than a preset temperature value, control the first light emitting apparatus to work in a fourth working mode, where the third working mode and the fourth working mode are different working modes.

With reference to the third aspect, in some implementations of the third aspect, that the first light emitting apparatus is controlled to work in the third working mode includes that the first light emitting apparatus is controlled to display a first color; and that the first light emitting apparatus is controlled to work in the fourth working mode includes that the first light emitting apparatus is controlled to display a second color, where the first color is different from the second color.

With reference to the third aspect, in some implementations of the third aspect, the first color is a warm hue, and the second color is a cool hue.

With reference to the third aspect, in some implementations of the third aspect, the sensor includes a temperature sensor, the first signal indicates a second temperature value, and the controller is further configured to: before controlling, based on the first signal, the first light emitting apparatus to work, obtain an instruction, where the instruction instructs the vehicle to detect an operation that a user located in the first area adjusts a temperature in the vehicle to a third temperature value; and the controller is further configured to: when the third temperature value is greater than the second temperature value, control the first light emitting apparatus to work in a fifth working mode; or when the third temperature value is less than the second temperature value, control the first light emitting apparatus to work in a sixth working mode, where the fifth working mode and the sixth working mode are different working modes.

With reference to the third aspect, in some implementations of the third aspect, that the first light emitting apparatus is controlled to work in the fifth working mode includes that the first light emitting apparatus is controlled to display a third color; and that the first light emitting apparatus is controlled to work in the sixth working mode includes that the first light emitting apparatus is controlled to display a fourth color, where the third color is different from the fourth color.

With reference to the third aspect, in some implementations of the third aspect, the third color is a warm hue, and the fourth color is a cool hue.

With reference to the third aspect, in some implementations of the third aspect, the controller is further configured to obtain an instruction, where the instruction instructs the vehicle to detect that an air exhaust direction of an air outlet of an air conditioner located in the first area is a first direction; and the controller is further configured to control the first light emitting apparatus to be displayed in a water flowing light form, where the water flowing light form matches the first direction.

With reference to the third aspect, in some implementations of the third aspect, the sensor includes a cup holder temperature sensor, and the first sensor is further configured to: collect the first signal after a user places a cup in a cup holder located in the first area, where the first signal indicates a fourth temperature value of liquid in the cup; and the controller is further configured to: when the fourth temperature value is greater than a fifth temperature value, control the first light emitting apparatus to display a warm hue; or when the fourth temperature value is less than a fifth temperature value, control the first light emitting apparatus to display a cool hue, where the fifth temperature is a temperature value of the liquid in the cup that is detected by the cup holder temperature sensor before the user places the cup in the cup holder.

With reference to the third aspect, in some implementations of the third aspect, the controller is further configured to: if the fourth temperature value is greater than the fifth temperature value, in a process in which a temperature detected by the cup holder temperature sensor cools down from the fourth temperature to the fifth temperature, control a color of the first light emitting apparatus to change from deep to light; or if the fourth temperature value is less than the fifth temperature value, in a process in which a temperature detected by the cup holder temperature sensor heats up from the fourth temperature to the fifth temperature, control a color of the first light emitting apparatus to change from deep to light.

With reference to the third aspect, in some implementations of the third aspect, the first light emitting apparatus is a cup holder ambient light.

With reference to the third aspect, in some implementations of the third aspect, the first signal indicates position information of an object around a first vehicle door, and there is a correspondence between the first vehicle door and the first area; and the controller is further configured to: when the vehicle is in a stationary state and the position information of the object meets a preset condition, control the first light emitting apparatus to work in a seventh mode.

With reference to the third aspect, in some implementations of the third aspect, the controller is further configured to: before controlling the first light emitting apparatus to work in the seventh mode, obtain an instruction, where the instruction instructs the vehicle to detect an operation that the user located in the first area is about to open a vehicle door.

With reference to the third aspect, in some implementations of the third aspect, the controller is further configured to: before controlling the first light emitting apparatus to work in the seventh mode, obtain an instruction, where the instruction instructs the vehicle to detect that the first area includes the user.

With reference to the third aspect, in some implementations of the third aspect, the controller is further configured to: when controlling the first light emitting apparatus to work in the seventh mode, control the first vehicle door to be locked.

With reference to the third aspect, in some implementations of the third aspect, the first light emitting apparatus includes a first interior light and a first exterior light, the seventh working mode includes a first sub-mode and a second sub-mode, and the controller is further configured to: control the first interior light to work in the first sub-mode, and control the first exterior light to work in the second sub-mode.

With reference to the third aspect, in some implementations of the third aspect, the controller is further configured to: before controlling the first light emitting apparatus to work, obtain user information of the user located in the first area; and obtain, based on the user information, light configuration information corresponding to the user information; and the controller is further configured to: control, based on the light configuration information, the first light emitting apparatus to work.

According to a fourth aspect, a light system is provided. The light system is applied to a vehicle, the vehicle includes a plurality of areas, each of the plurality of areas includes at least one light emitting apparatus and at least one sensor of a first type, the plurality of areas include a first area, the light system includes a first light emitting apparatus and a first sensor that are located in the first area, a type of the first sensor is the first type, the first light emitting apparatus includes a first interior light and a first exterior light, and the light system further includes a controller. The first sensor is configured to collect a first signal. The controller is configured to control, based on the first signal, the first interior light and the first exterior light to work.

With reference to the fourth aspect, in some implementations of the fourth aspect, the first signal indicates that the vehicle is currently in an autonomous driving mode, and the controller is further configured to: control, based on the first signal, the first interior light to work in a first mode and control the first exterior light to work in a second working mode, where the first working mode notifies a user inside the vehicle that the vehicle is currently in the autonomous driving mode, and the second working mode notifies a user outside the vehicle that the vehicle is currently in the autonomous driving mode.

With reference to the fourth aspect, in some implementations of the fourth aspect, the controller is further configured to: obtain an instruction, where the instruction indicates that the vehicle needs to be taken over by a driver; and control, in response to the obtained instruction, the first interior light to switch from the first mode to a third mode to work.

With reference to the fourth aspect, in some implementations of the fourth aspect, the controller is further configured to control the first exterior light to stop working in the second mode.

With reference to the fourth aspect, in some implementations of the fourth aspect, the first signal indicates position information of an object around a first vehicle door; and the controller is further configured to: when the vehicle is in a stationary state and the position information of the object meets a preset condition, control the first interior light to work in a third mode and control the first exterior light to work in a fourth working mode.

With reference to the fourth aspect, in some implementations of the fourth aspect, the controller is further configured to obtain an instruction before controlling the first interior light to work in the third mode and controlling the first exterior light to work in the fourth working mode, where the instruction instructs the vehicle to detect an operation that a user located in a first area is about to open a vehicle door, and there is a correspondence between the first area and the first vehicle door.

With reference to the fourth aspect, in some implementations of the fourth aspect, the controller is further configured to obtain an instruction before controlling the first interior light to work in the third mode and controlling the first exterior light to work in the fourth working mode, where the instruction instructs the vehicle to detect that the first area includes the user, and there is a correspondence between the first area and the first vehicle door.

With reference to the fourth aspect, in some implementations of the fourth aspect, the controller is further configured to: when controlling the first interior light to work in the third mode and controlling the first exterior light to work in the fourth working mode, control the first vehicle door to be locked.

With reference to the fourth aspect, in some implementations of the fourth aspect, the controller is further configured to: before controlling the first interior light to work in the third mode and controlling the first exterior light to work in the fourth working mode, obtain user information of the user located in the first area, where there is a correspondence between the first area and the first vehicle door; and obtain, based on the user information, light configuration information corresponding to the user information; and the controller is further configured to: based on the light configuration information, control the first interior light to work in the third mode and control the first exterior light to work in the fourth working mode.

According to a fifth aspect, an apparatus is provided. The apparatus includes a unit configured to perform the interior light control method in any one of the first aspect or the implementations of the first aspect or any one of the second aspect or the implementations of the second aspect.

According to a sixth aspect, a vehicle is provided. The vehicle includes the light system in any one of the third aspect or the possible implementations of the third aspect or any one of the fourth aspect or the possible implementations of the fourth aspect.

According to a seventh aspect, an apparatus is provided. The apparatus includes a processing unit and a storage unit, the storage unit is configured to store instructions, and the processing unit executes the instructions stored in the storage unit, so that the apparatus performs the method in any one of the first aspect or the possible implementations of the first aspect or any one of the second aspect or the possible implementations of the second aspect.

Optionally, the processing unit may be a processor, and the storage unit may be a memory. The memory may be a storage unit (for example, a register or a cache) in a chip, or may be a storage unit (for example, a read-only memory, or a random access memory) located outside the chip in a vehicle.

According to an eighth aspect, a computer program product is provided. The computer program product includes computer program code. When the computer program code is run on a computer, the computer is enabled to perform the method in the foregoing first aspect or second aspect.

It should be noted that the computer program code can be totally or partially stored in a first storage medium. The first storage medium can be encapsulated with a processor, or encapsulated separately from a processor. This is not specifically limited in embodiments.

According to a ninth aspect, a computer-readable medium is provided. The computer-readable medium stores program code. When the computer program code is run on a computer, the computer is enabled to perform the method in the foregoing first aspect or second aspect.

BRIEF DESCRIPTION OF THE DRAWINGS

FIG. 6 is a schematic flowchart of a method for controlling a distributed speech ambient light according to an embodiment;

DETAILED DESCRIPTION

The following describes the technical solutions with reference to accompanying drawings.

Figure 1:
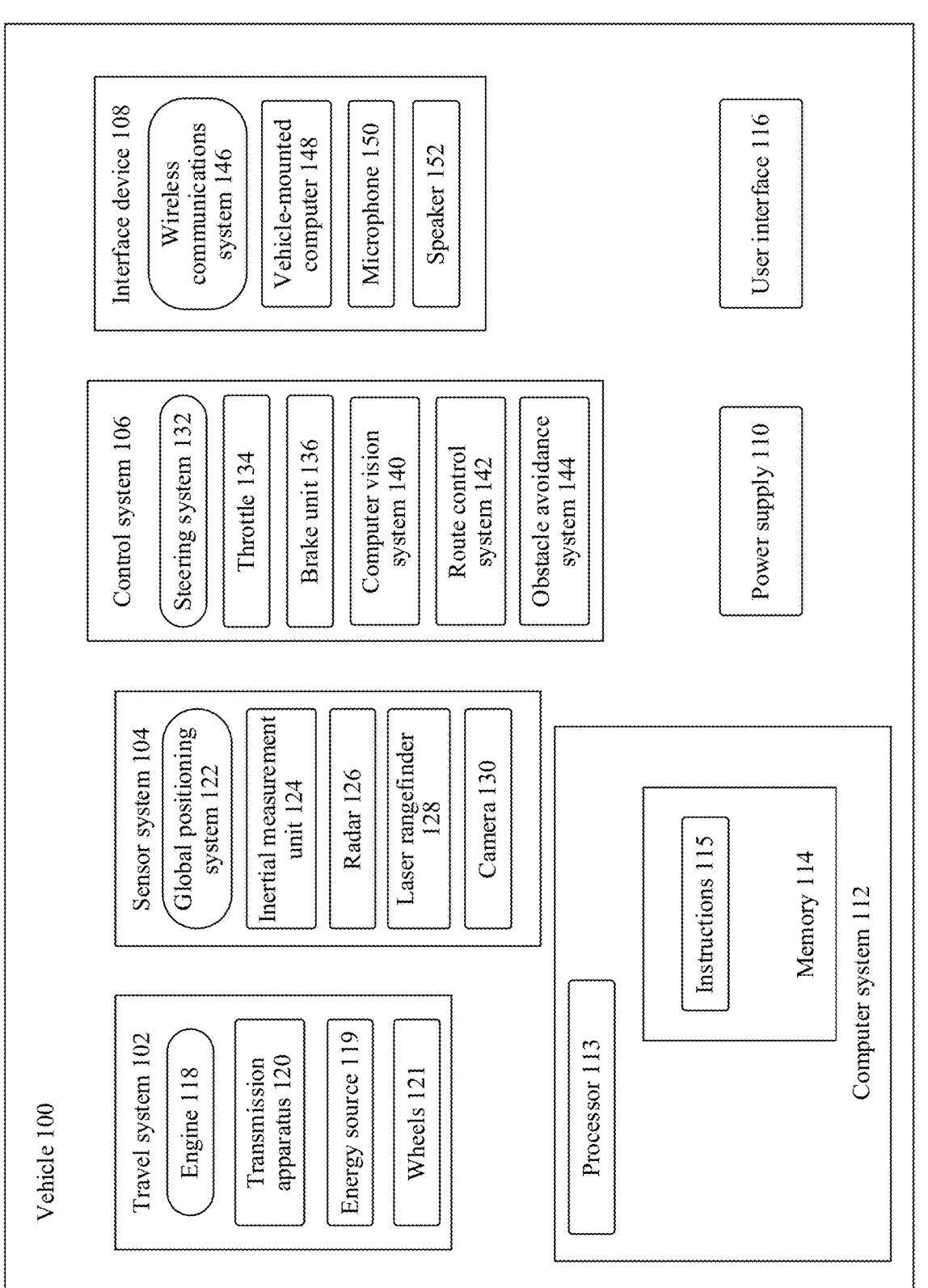
FIG. 1 is a functional block diagram of a vehicle 100 according to an embodiment.

FIG. 1 is a functional block diagram of a vehicle 100 according to an embodiment. In an embodiment, the vehicle 100 is configured to be in a fully or partially autonomous driving mode. For example, the vehicle 100 in the autonomous driving mode may control the vehicle 100. A manual operation may be performed to determine current states of the vehicle and an ambient environment of the vehicle, determine possible behavior of at least one another vehicle in the ambient environment, determine a confidence level corresponding to a possibility that the another vehicle performs the possible behavior, and control the vehicle 100 based on determined information. When the vehicle 100 is in the autonomous driving mode, the vehicle 100 may be set to operate without interacting with a person.

The vehicle 100 may include various subsystems, for example, a travel system 102, a sensor system 104, a control system 106, one or more interface devices 108, a power supply 110, a computer system 112, and a user interface 116. In an embodiment, the vehicle 100 may include more or fewer subsystems, and each subsystem may include a plurality of elements. In addition, each subsystem and element of the vehicle 100 may be interconnected in a wired or wireless manner.

The travel system 102 may include a component that provides power for the vehicle 100 to move. In an embodiment, the propulsion system 102 may include an engine 118, an energy source 119, a transmission apparatus 120, and wheels/tires 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

The sensor system 104 may include several sensors that sense information about an ambient environment of the vehicle 100. For example, the sensor system 104 may include a positioning system 122 (the positioning system may be a Global Positioning System (GPS) system, a BeiDou system, or another positioning system), an inertial measurement unit (IMU) 124, a radar 126, a laser rangefinder 128, and a camera 130. The sensor system 104 may further include a sensor (for example, an in-vehicle air quality monitor, a fuel gauge, or an engine oil thermometer) of an internal system of the monitored vehicle 100. Sensor data from one or more of these sensors may be used for detecting an object and corresponding characteristics (a position, a shape, a direction, a speed, and the like) of the object. Such detection and identification are key functions of a security operation of the autonomous vehicle 100.

The control system 106 controls operations of the vehicle 100 and the components of the vehicle 100. The control system 106 may include various elements, including a steering system 132, a throttle 134, a brake unit 136, a sensor fusion algorithm 138, a computer vision system 140, a route control system 142, and an obstacle avoidance system 144.

The vehicle 100 interacts with an external sensor, another vehicle, another computer system, or a user by using the interface device 108. The interface device 108 may include a wireless communications system 146, a vehicle-mounted computer 148, a microphone 150, and/or a speaker 152.

In some embodiments, the interface device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive user's input. The vehicle-mounted computer 148 may be operated by using a touch-screen. In another case, the interface device 108 may provide a means for the vehicle 100 to communicate with another device located in the vehicle. For example, the microphone 150 may receive audio (for example, a speech command or another audio input) from the user of the vehicle 100. Likewise, the speaker 152 may output audio to the user of the vehicle 100.

The wireless communications system 146 may communicate with one or more devices directly or through a communications network. For example, the wireless communications system 146 implements wireless communication by using a vehicle-mounted antenna, for example, 3G cellular communication, a Global System for Mobile Communications (GSM) communications technology, a wideband code-division multiple access (WCDMA) communications technology, 4G cellular communication (for example, a Long-Term Evolution (LTE) communications technology), or 5G cellular communication. The wireless communications system 146 may communicate with a wireless local area network (WLAN) by using a vehicle-mounted antenna through Wi-Fi. In some embodiments, the wireless communications system 146 may communicate directly with a device through an infrared link or by using Bluetooth or ZigBee. Other wireless protocols, for example, various vehicle communications systems such as the wireless communications system 146, may include one or more dedicated short-range communications (DSRC) devices, and these devices may include public and/or private data communications between vehicles and/or roadside stations.

Some or all functions of the vehicle 100 are controlled by the computer system 112. The computer system 112 may include at least one processor 113. The processor 113 executes instructions 115 stored in a non-transient computer-readable medium like a data storage apparatus 114. The computer system 112 may alternatively be a plurality of computing devices that control an individual component or a subsystem of the vehicle 100 in a distributed manner.

The user interface 116 is configured to provide information for or receive information from the user of the vehicle 100. In an embodiment, the user interface 116 may include one or more input/output devices in a set of interface devices 108, for example, the wireless communications system 146, the vehicle-mounted computer 148, the microphone 150, and the speaker 152.

In an embodiment, one or more of the foregoing components may be installed separately from or associated with the vehicle 100. For example, the data storage apparatus 114 may be partially or totally separated from the vehicle 1100. The foregoing components may be communicatively coupled together in a wired and/or wireless manner.

In an embodiment, the foregoing components are merely examples. In actual application, components in the foregoing modules may be added or deleted according to an actual requirement. FIG. 1 should not be understood as a limitation on embodiments.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in embodiments.

An ambient light, also referred to as ambient lighting, usually occurs at a steering wheel, a center console, a puddle light, a cup holder, a roof, a courtesy light, a courtesy pedal, a vehicle door, a rear trunk, and a vehicle light of a vehicle. The ambient light is mainly represented in a single color, multiple colors, a breathing rhythm, a music rhythm, and the like. A satisfied ambient light gives people domestic warmness and comfort and a sense of technological beauty and luxury. In recent years, the ambient light, as a product for vehicle decoration and atmosphere creation, is gradually popularized from a high-end vehicle model to a middle-class vehicle model. In recent years, an exterior decorative light is also popular among vehicles, and the exterior decorative light may usually include an indicator light, a brake light, a fog light, an illuminating light, a side marker light, a vehicle dome light, a plate illuminating device, a chassis light, a wheel light, and the like. Currently, an ambient light, as a product for vehicle decoration and atmosphere creation, can only function in creating a vehicular atmosphere, which leads to poor user experience.

Embodiments provide an interior light control method, an in-vehicle light system, and a vehicle. The in-vehicle light system can control an interior light by using real-time perception and computing capabilities of vehicle-mounted artificial intelligence (AI). This helps to improve intelligence of the in-vehicle light system, thereby helping improve user experience. For example, the in-vehicle light system may indicate a plurality of functions or scenarios such as a voice assistant, a vehicle state, autonomous driving, and a vehicle infotainment system by using the interior light, so that a user can more easily understand the function and their attention can be raised. For example, the in-vehicle light system indicates autonomous driving in advance in an autonomous driving scenario. This enhances human-machine mutual trust, and helps improve driving experience. For example, the in-vehicle light system may further adaptively adjust a light based on a scenario, and implement communication with the user by using a personalized lighting signal.

Figure 2:
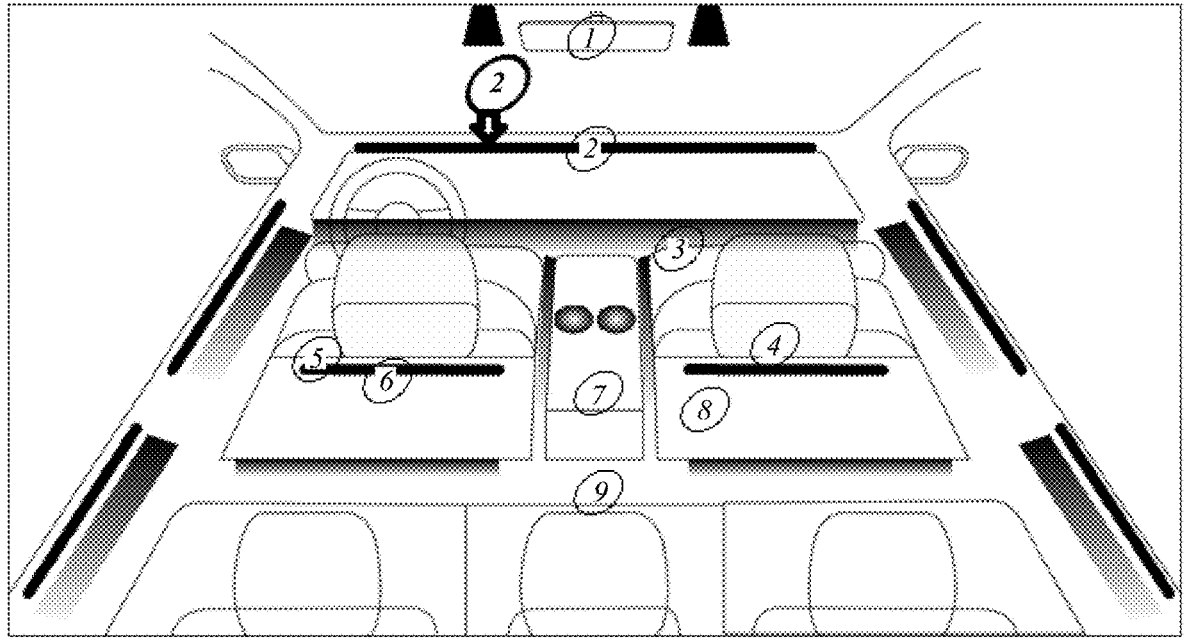
FIG. 2 is a schematic diagram of distribution of interior lights according to an embodiment.

Before the technical solutions in embodiments are described, a schematic diagram of distribution of interior lights according to an embodiment is described first with reference to FIG. 2. As shown in FIG. 2, Position 1 indicates a reading spot light, Position 2 indicates an instrument panel ambient strip light, Position 3 indicates indirect light of an instrument panel ambient light, Position 4 indicates a cup holder ambient light, Position 5 indicates a door panel ambient strip light, Position 6 indicates indirect light of a door panel ambient light, Position 7 indicates a backrest ambient strip light, Position 8 indicates indirect light of an auxiliary instrument panel ambient light, and Position 9 indicates indirect light of a foot bottom ambient light.

Figure 3:
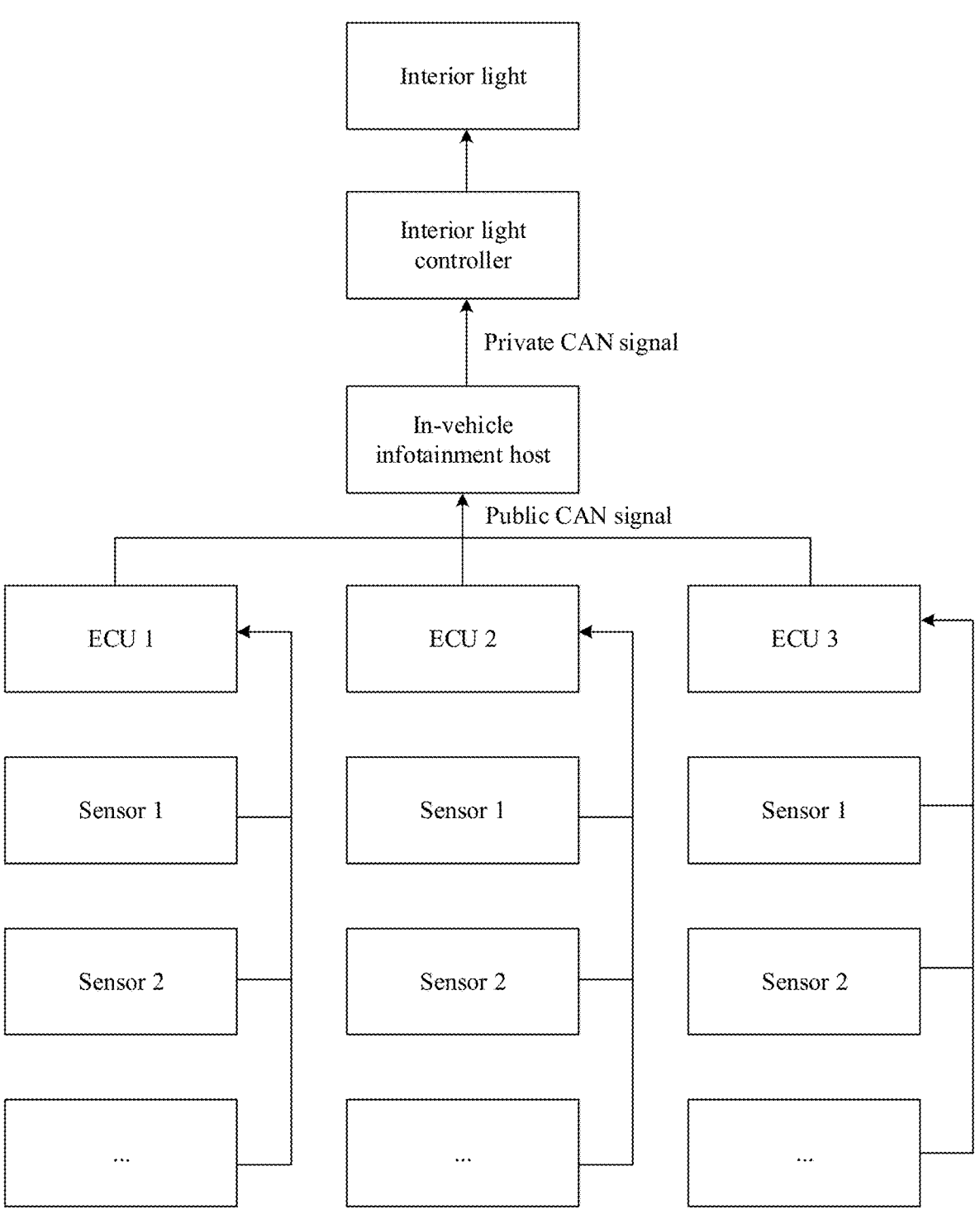
FIG. 3 is a schematic diagram of a structure of an in-vehicle light system according to an embodiment.

Two in-vehicle light systems provided in embodiments are described below with reference to FIG. 3 and FIG. 4. FIG. 3 is a schematic diagram of a structure of an in-vehicle light system according to an embodiment. The in-vehicle light system may be a Controller Area Network (CAN) control system. The CAN control system may include a plurality of sensors (for example, a sensor 301 and a sensor 302), a plurality of electronic control units (ECUs), and an in-vehicle infotainment host, an interior light controller, and an interior light. The sensor includes but is not limited to a camera, a microphone, an ultrasonic radar, a millimeter-wave radar, a lidar, a vehicle speed sensor, a motor power sensor, an engine rotation speed sensor, and the like. The ECU is configured to receive data collected by the sensor, execute a corresponding command, and obtain a periodic signal or an event signal after executing the corresponding command, so that the ECU can send the signal to a public CAN network. The ECU includes but is not limited to a vehicle controller, a hybrid power controller, an automatic velocity box controller, an autonomous driving controller, and the like. The in-vehicle infotainment host is configured to capture a periodic signal or an event signal sent by each ECU on the public CAN network, and execute a corresponding lighting signal algorithm or forward the signal to the interior light controller when a corresponding signal state is identified. The interior light controller (for example, an ambient light controller) is configured to receive a command signal from the in-vehicle infotainment host on a private CAN network, execute a lighting signal in a corresponding mode, so as to perform power supply in striping, segmentation, partition, and driving control for the interior light (for example, an ambient light). The interior light (for example, the ambient light) can turn on or off or blink. For example, in an embodiment, the in-vehicle infotainment host may capture a vehicle speed signal from a CAN bus. The in-vehicle infotainment host can calculate acceleration of a vehicle based on the vehicle speed signal and send the acceleration to the interior light controller. The interior light controller determines a color change process of the ambient light based on a mapping relationship between acceleration and an ambient light color, so as to control a change of the ambient light. Alternatively, after calculating the acceleration of the vehicle, the in-vehicle infotainment host may determine the ambient light color based on the mapping relationship between the acceleration and the ambient light color, and send the ambient light color to the interior light controller, so that the interior light controller determines the ambient light based on the ambient light color.

Figure 4:
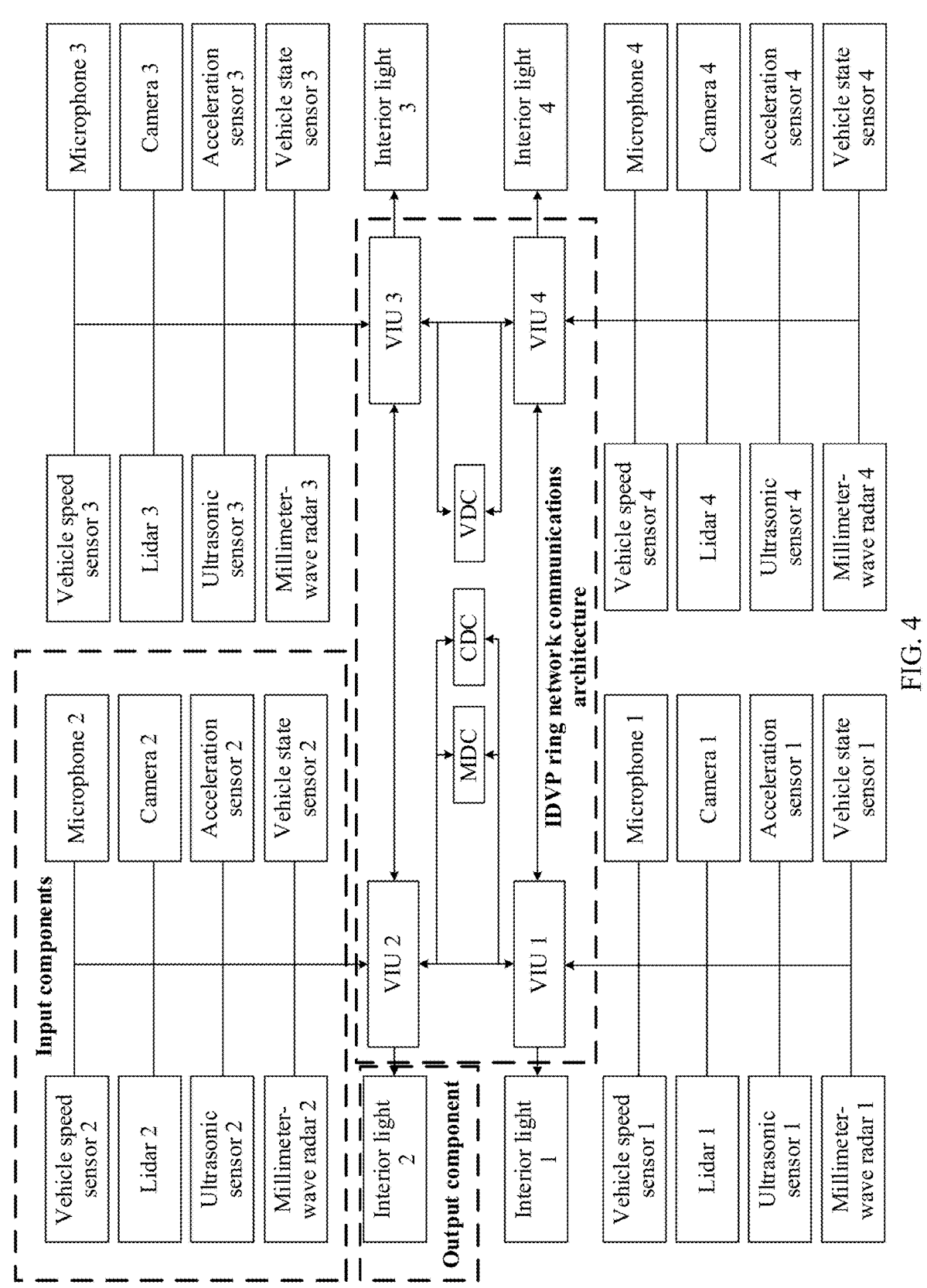
FIG. 4 is a schematic diagram of another structure of an in-vehicle light system according to an embodiment.

FIG. 4 is a schematic diagram of another structure of an in-vehicle light system according to an embodiment. The in-vehicle light system may be a ring network communications architecture. All sensors and executors (for example, components such as an interior light, an air conditioner, and a motor that obtain and execute a command) may be connected to a nearby vehicle integration unit (VIU). As a communications interface unit, the VIU may be deployed at a position in which vehicle sensors and executors are dense, so that the sensors and the executors of the vehicle can perform nearby connection. In addition, the VIU may have specific computing and driving capabilities (for example, the VIU may absorb driving computing functions of some executors). The sensor includes but is not limited to a camera, a microphone, an ultrasonic radar, a millimeter-wave radar, a lidar, a vehicle speed sensor, a motor power sensor, an engine rotation speed sensor, and the like.

It should be understood that the VIU may absorb driving computing functions of some sensors and executors. In this way, when some executors (for example, a cockpit domain controller (CDC) or a vehicle domain controller (VDC)) are faulty, the VIU may directly process data collected by the sensor, to drive the interior light to turn on or off or blink.

VIUs communicate with each other through networking. An intelligent driving computing platform/A mobile data center (MDC), a VDC, and a CDC are separately and redundantly connected to the ring network communications network formed by the VIUs. After the sensor collects the data, the sensor may send the collected data to the VIU. The VIU may release the data on the ring network. The MDC, the VDC, and the CDC collect related data on the ring network, calculate the data, convert the data into a lighting signal of the corresponding interior light, and release the signal on the ring network. Based on the corresponding computing and driving capabilities of the VIU, the interior light is driven to perform a corresponding lighting signal or turn on or off.

It should be understood that, as shown in FIG. 4, there may be a correspondence between different VIUs and interior lights at different positions. For example, a VIU 1 is configured to drive an interior light 1, a VIU 2 is configured to drive an interior light 2, a VIU 3 is configured to drive an interior light 3, and a VIU 4 is configured to drive an interior light 4. An arrangement form of a VIU may be unrelated to an interior light. For example, the VIU 1 may be disposed at the left rear of a vehicle, and the interior light 1 may be a door panel ambient light on a driver side. The sensor or executer can be connected to the nearby VIU, thereby reducing cable bundles. Due to a limited quantity of interfaces of the MDC, VDC, and CDC, the VIU can be connected a plurality of sensors and a plurality of executers to implement interface and communication functions.

It should be further understood that, in an embodiment, a VIU to which the sensor or a controller is connected and a controller by which the connection is controlled may be set before delivery of the in-vehicle light system, or may be defined by a user, and hardware of the in-vehicle light system may be replaced and upgraded.

It should be further understood that, the in-vehicle light systems in FIG. 3 and FIG. 4 may also control, in addition to the interior light, an exterior decorative light to work.

The foregoing describes schematic diagrams of the interior lights and the structures of the in-vehicle light system with reference to FIG. 2 to FIG. 4. The following describes, with reference to accompanying drawings, manners of controlling the interior light in different scenarios provided in embodiments.

FIGS. 5A-5D are schematic diagrams of effects of ambient lights in distributed speech scenarios according to an embodiment.

Figure 5A:
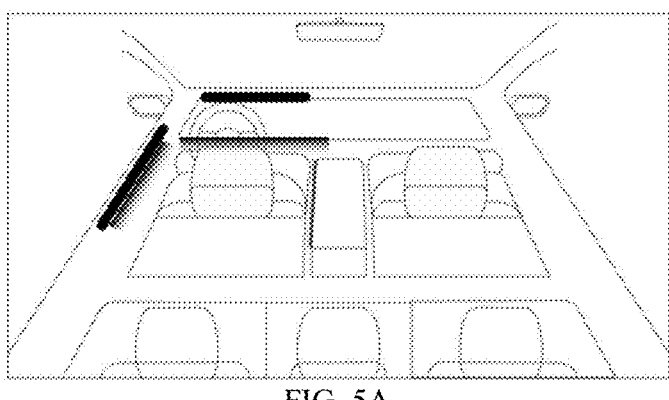
FIGS. 5A-5D are schematic diagrams of effects of ambient lights in distributed speech scenarios according to an embodiment.

As shown in FIG. 5A, an in-vehicle light system may drive an ambient light in a driver area when determining that a user in the driver area is in a conversation with an in-vehicle voice assistant. For example, the in-vehicle light system may control an instrument panel ambient strip light, indirect light of an instrument panel ambient light, a door panel ambient strip light, indirect light of a door panel ambient light, and indirect light of an auxiliary instrument panel ambient light in the driver area to turn on.

Figure 5B:
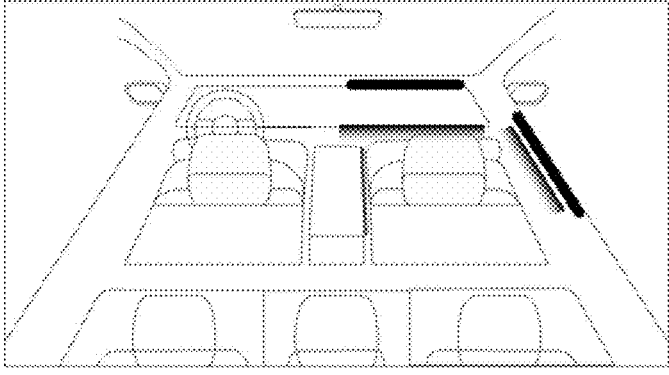

As shown in FIG. 5B, the in-vehicle light system may drive an ambient light in a front passenger area when determining that a user in the front passenger area is in a conversation with the in-vehicle voice assistant. For example, the in-vehicle light system may control an instrument panel ambient strip light, indirect light of an instrument panel ambient light, a door panel ambient strip light, indirect light of a door panel ambient light, and indirect light of an auxiliary instrument panel ambient light in the front passenger area to turn on.

Figure 5C:
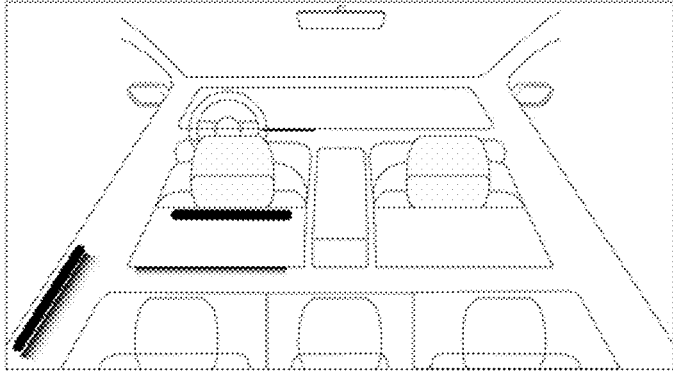

As shown in FIG. 5C, the in-vehicle light system may drive an ambient light in a second-row left-side area when determining that a user in the second-row left-side area is in a conversation with the in-vehicle voice assistant. For example, the in-vehicle light system may control a door panel ambient strip light, indirect light of a door panel ambient light, a backrest ambient strip light, and indirect light of a foot bottom ambient light in the second-row left-side area to turn on.

Figure 5D:
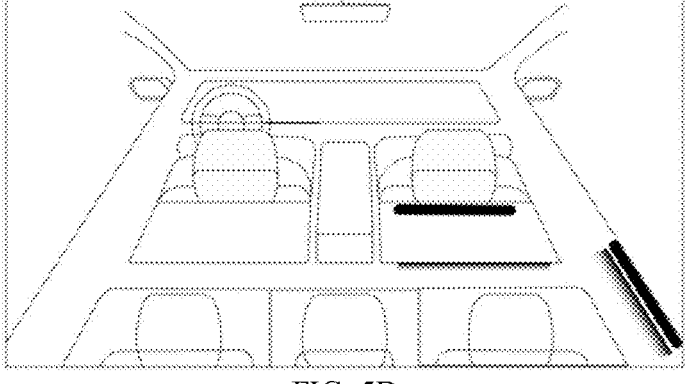

As shown in FIG. 5D, the in-vehicle light system may drive an ambient light in a second-row right-side area when determining that a user in the second-row right-side area is in a conversation with the in-vehicle voice assistant. For example, the in-vehicle light system may control a door panel ambient strip light, indirect light of a door panel ambient light, a backrest ambient strip light, and indirect light of a foot bottom ambient light in the second-row right-side area to turn on.

FIG. 6 is a schematic flowchart of a method for controlling a distributed speech ambient light according to an embodiment. As shown in FIG. 6, the method for controlling the distributed speech ambient light may include the following steps.

S601: A microphone collects a speech signal from a user.

For example, areas in a vehicle may be divided into a driver area, a front passenger area, a second-row left-side area, and a second-row right-side area. Each area may include a microphone corresponding to the area. When a voice assistant of the vehicle is in a non-wake-up state, the microphone in each area of the vehicle may be in a sound pickup state.

It should be understood that in an embodiment, the areas in the vehicle may be divided into the driver area, the front passenger area, the second-row left-side area, and the second-row right-side area, or may be divided in another manner. This is not limited in embodiments. For example, the areas in the vehicle may be divided into a driver area, a front passenger area, a second-row left-side area, a second-row middle area, and a second-row right-side area; or the areas in the vehicle may be divided into a driver area, a front passenger area, a second-row left-side area, a second-row right-side area, and a rear trunk area. When the vehicle includes a third row of seats, the areas in the vehicle may be divided into a driver area, a front passenger area, a second-row left-side area, a second-row right-side area, a third-row left-side area, and a third-row right-side area. For another example, a five-seat sedan may be divided into a front-row area and a back-row area. For another example, a seven-seat SUV may be divided into a front-row area, a middle-row area, and a back-row area. For another example, a coach may be divided into a cockpit area, a cabin front area, a cabin middle area, and a cabin back area. For another example, the vehicle may be divided into an internal area and an external area. For another example, an area division manner may be a combination of the foregoing different area division manners. It should be understood that quantities of sensors may also be different when the areas are divided in different manners.

In an embodiment, after detecting that the user taps a speech wakeup button, the vehicle may control the microphone in an in-vehicle light system to collect the speech signal from the user. In an embodiment, the voice button may be located on a steering wheel in the driver area, may be located on a large central console screen, or may be located in the second-row left-side area or the second-row right-side area. This is not limited in embodiments.

S602: The microphone sends the collected speech signal to a VIU.

For example, with reference to the schematic diagram of the structure of the in-vehicle light system shown in FIG. 4, a microphone 1 is a microphone in a driver area, a microphone 2 is a microphone in a front passenger area, a microphone 3 may be a microphone in a second-row left-side area, and a microphone 4 may be a microphone in a second-row right-side area. The microphone 1 may send a captured speech signal 1 to the VIU 1, the microphone 2 may send a captured speech signal 2 to the VIU 2, the microphone 3 may send a captured speech signal 3 to the VIU 3, and the microphone 4 may send a captured speech signal 4 to the VIU 4.

S603: The VIU forwards the speech signal to a ring network.

S604: After obtaining the speech signal on the ring network, a CDC may release, based on the speech signal, a speech state signal that carries position information on the ring network.

For example, the VIU 1, the VIU 2, the VIU 3, and the VIU 4 may release speech signals on the ring network after receiving the corresponding speech signals; and after receiving the speech signal 1, the speech signal 2, the speech signal 3, and the speech signal 4, the CDC may determine the area in which the user sends the speech signal. For example, the CDC may determine, based on signal strength of the speech signal 1, the speech signal 2, the speech signal 3, and the speech signal 4, that a speech signal with the highest signal strength is the speech signal 1. Because the speech signal 1 is a speech signal collected by the microphone 1 and released on the ring network by the VIU 1, the CDC may determine that the speech signal is the speech signal collected by the microphone in the driver area. Therefore, the CDC can release the signal (for example, the signal may include a speech state signal in a lighting signal mode 1, and the lighting signal mode 1 is turning on the ambient light) that carries driver area position information on the ring network.

S605: The VIU drives a corresponding ambient light based on the speech state signal that carries the position information.

In an embodiment, each area may correspond to a VIU. For example, the VIU 1 may correspond to the driver area, the VIU 2 may correspond to the front passenger area, the VIU 3 may correspond to the second-row left-side area, and VIU 3 may correspond to the second-row left-side area, and the VIU 4 may correspond to the second-row right-side area. After the CDC releases the signal that carries the driver area position information on the ring network, the VIU 4 may first receive the signal that carries the driver area position information. Because VIU 4 corresponds to the second-row right-side area, after receiving the signal that carries the driver area position information, the VIU 4 may forward the signal to the VIU 1 without performing any operation. Because the VIU 1 corresponds to the driver area, after receiving the signal that carries the driver area position information, the VIU 1 may execute a corresponding voice instruction (for example, execute an instruction corresponding to the lighting signal mode 1), to turn on the interior light 1.

In an embodiment, the VIU also corresponds to ambient light identifier information. For example, Table 1 shows a correspondence between a VIU and ambient light identifier information.

TABLE 1

| Vehicle integration unit | Ambient light identifier information | Name of a corresponding ambient light |
|---|---|---|
| VIU 1 | 1 | Instrument panel ambient light in a driver area |
| | 2 | Indirect light of an instrument panel ambient light in the driver area |
| | . . . | . . . |
| VIU 2 | 3 | Instrument panel ambient light in a front passenger area |
| | 4 | Indirect light of an instrument panel ambient light in the front passenger area |
| | . . . | . . . |
| VIU 3 | 5 | Backrest ambient strip light in a second-row left-side area |
| | 6 | Foot bottom ambient light in the second-row left-side area |
| | . . . | . . . |
| VIU 4 | 7 | Backrest ambient strip light in a second-row right-side area |
| | 8 | Foot bottom ambient light in the second-row right-side area |
| | . . . | . . . |

It should be understood that the correspondence between the VIU and the ambient light identifier information shown in Table 1 is merely an example, and embodiments are not limited thereto.

For example, the CDC may release a signal that carries ambient light identifier information 1 and ambient light identifier information 2 (for example, a speech state signal including a lighting signal mode 2, and the lighting signal mode 2 is a left-to-right water flowing light) on the ring network. After the CDC releases the signal that carries the ambient light identifier information 1 and the ambient light identifier information 2 on the ring network, the VIU 4 may first receive the signal that carries the ambient light identifier information 1 and the ambient light identifier information 2. Because the VIU 4 does not correspond to an ambient light identifier 1 and an ambient light identifier 2, after receiving the signal that carries the ambient light identifier information 1 and the ambient light identifier information 2, the VIU 4 may forward the speech state signal to the VIU 1 without performing any operation. Because the VIU 1 corresponds to the ambient light identifier 1 and the ambient light identifier 2, after receiving the signal that carries the ambient light identifier 1 and the ambient light identifier 2, the VIU 1 may execute a corresponding voice instruction (for example, execute an instruction corresponding to the lighting signal mode 2), to drive the instrument panel ambient light in the driver area to be displayed in a water flowing light form.

In an embodiment, the in-vehicle light system may drive an ambient light in a corresponding area when determining that a user in the area is in a conversation with an in-vehicle voice assistant. In this way, when the in-vehicle voice assistant is in a wakeup state, a listening state, a speech thinking state, and an execution state, the user turns on the respective ambient lights in the corresponding areas.

In an embodiment, after the user located in the driver area, the front passenger area, the second-row left-side area, or the second-row right-side area wakes up the voice assistant, the in-vehicle light system may turn on the ambient light in the corresponding area, and in different states, the in-vehicle light system can execute a lighting signal corresponding to a speech state. For example, a lighting signal mode 1 is executed in the speech wakeup state; a lighting signal mode 2 is executed in the speech listening state; a lighting signal mode 3 is executed in the speech thinking state; and a lighting signal mode 4 is executed in the speech execution state.

Figure 7:
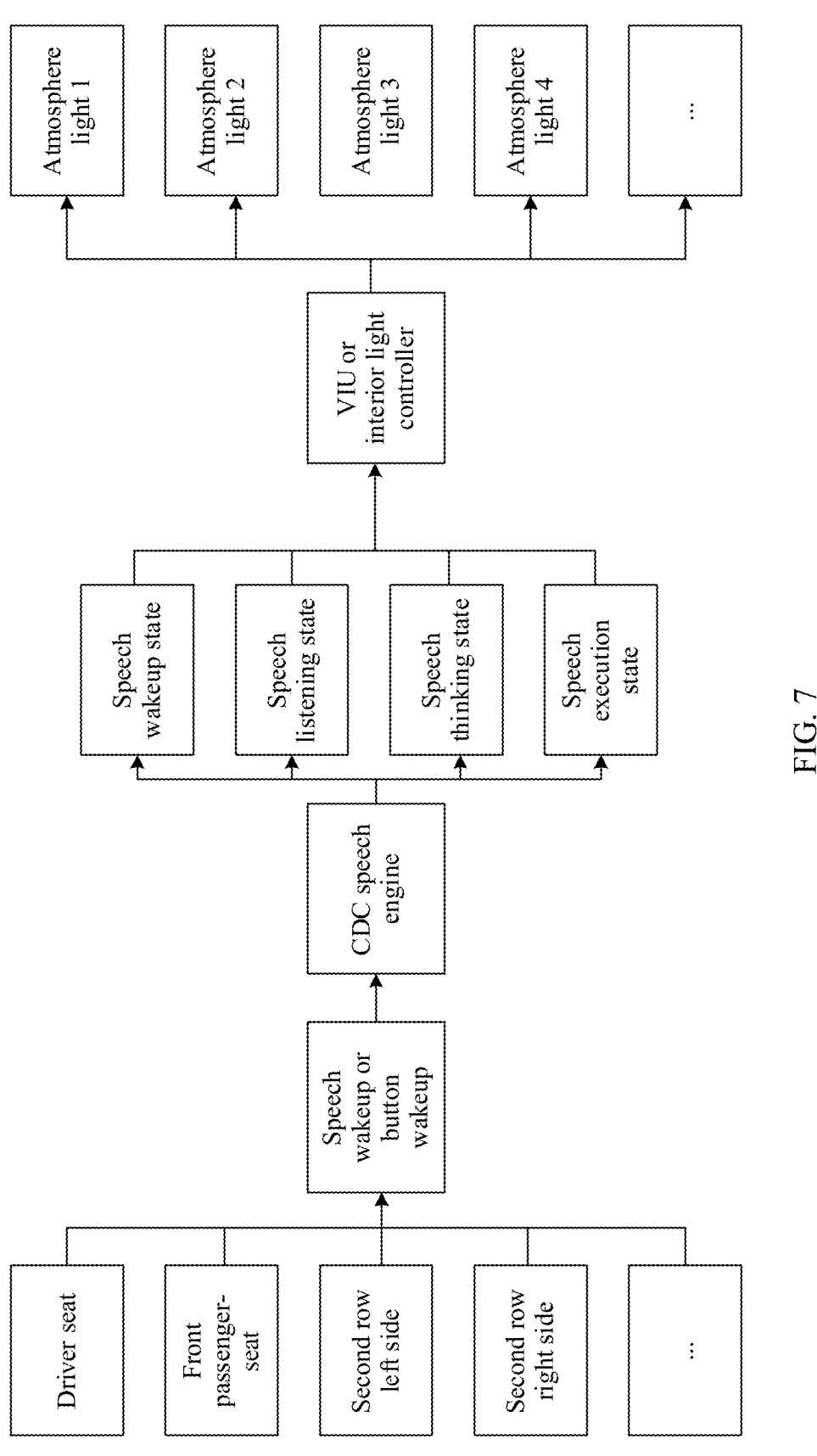
FIG. 7 is a schematic flowchart of a method for controlling a distributed speech ambient light according to an embodiment.

FIG. 7 is a schematic flowchart of a method for controlling a distributed speech ambient light according to an embodiment. In a process in which an in-vehicle light control system detects that a user in a driver area wakes up a voice assistant by using a speech or a button, a CDC may determine that the voice assistant is currently in a speech wakeup state. The CDC may release a speech state signal 1 that carries driver area position information on a ring network, and a VIU 1 may execute a lighting signal mode 1 to turn on an ambient light 1. After the voice assistant is woken up and before the CDC receives a new speech signal, the CDC may release a speech state signal 2 that carries the driver area position information on the ring network, and the VIU 1 may execute a lighting signal mode 2 to turn on an ambient light 2. Before the CDC receives a speech signal including a speech command and the CDC outputs a corresponding speech feedback, the CDC may release a speech state signal 3 that carries the driver area position information on the ring network, and the VIU 1 may execute a lighting signal mode 3 to turn on an ambient light 3. In a process in which the CDC outputs the speech feedback to the user, the CDC may release a speech state signal 4 that carries the driver area position information on the ring network, and the VIU 1 may execute a lighting signal mode 4 to turn on an ambient light 4.

For example, when the voice assistant is not woken up, the interior ambient light may be in an off state. When a microphone collects a speech signal "Celia, Celia" that carries a wakeup word from the user, the microphone may send the collected speech signal to the VIU and the VIU releases the collected speech signal on the ring network. When receiving the speech signal that carries the wakeup word, the CDC may determine that the speech signal includes the wakeup word. The CDC may perform speech wakeup (for example, the CDC may notify the user by using a speech "Master, I am here!") and send the speech state signal 1 that carries the driver area position information on the ring network. The speech state signal 1 indicates to turn on the red ambient light in the driver area. When receiving the speech state signal 1, the VIU 1 may control the ambient light in the driver area to turn on and control a color of the ambient light to be red.

After the voice assistant is woken up and before the CDC receives the speech signal that carries the speech command, the CDC may release the speech state signal 2 that carries the driver position information on the ring network. The speech signal state 2 indicates to switch the color of the ambient light from red to blue. After receiving the speech state signal 2, the VIU 1 may control the color of the ambient light in the driver area to switch from red to blue.

When the microphone detects the speech signal "Help me play Song 1 of singer xx" that carries the speech command sent by the user, the microphone may send the speech signal to the VIU and the VIU releases the speech signal on the ring network. When the CDC receives the speech signal that carries the speech command, the speech thinking state is enabled. In this case, the CDC may release the speech state signal 3 that carries the driver position information on the ring network. The speech state signal 3 indicates to switch the color of the ambient light from blue to purple. When receiving the speech state signal 3, the VIU 1 may control the color of the ambient light in the driver area to switch from blue to purple. In addition, the CDC analyzes a user intent and a slot by using an automatic speech recognition (ASR) module and natural language understanding (NLU) module in a speech engine.

For example, information obtained by converting the speech into a text by the ASR module is "Play Song 1 of singer xx for me". From this sentence, the NLU module can obtain content shown in Table 2 through parsing.

TABLE 2

| | |
|---|---|
| Intent | Listen to music |
| Slot | Singer = Singer xx |
| | Song name = Song 1 |

After obtaining the user intent and slot, the CDC may perform a corresponding operation (for example, playing Song 1) and release the speech state signal 4 that carries the driver position information on the ring network. The speech state signal 4 indicates to switch the color of the ambient light from purple to green. When receiving the speech state signal 4, the VIU 1 may control the color of the ambient light in the driver area to switch from purple to green.

In an embodiment, before playing Song 1, the CDC may further notify the user by using a speech "OK, master, be ready to play Song 1 for you".

It should be understood that the foregoing is described by using an example in which the in-vehicle light system may switch between different colors of the ambient light in different speech states. Embodiments are not limited thereto. For example, in the speech wakeup state, the in-vehicle light system may further turn on the red ambient light in the driver area by using a breathing light; in the speech listening state, the in-vehicle light system may further turn on the red ambient light in the driver area by using a water flowing light; in the speech thinking state, the in-vehicle light system may further turn on the blue ambient light in the driver area by using a water flowing light; and in the speech execution state, the in-vehicle light system may further turn on the blue ambient light in the driver area by using a breathing light.

In an embodiment, a change mode of the ambient light in different speech states may be preset, or may be set by the user. This is not limited in embodiments.

In an embodiment, before controlling a vehicle light in an area to work, the in-vehicle light system may further obtain user information of the area, and obtain, based on the user information, a matching relationship between the user information and a vehicle light working mode. The in-vehicle light system may control, based on the matching relationship, the vehicle light in the area to work in a mode. For example, a passenger in a front passenger area sends a voice instruction, and the in-vehicle light system may determine, based on image information collected by a camera, that the user in the front passenger area is a user A. The in-vehicle light system may obtain a vehicle light working mode preferred by the user A. For example, Table 3 shows a correspondence between preferred vehicle light display modes and different users.

TABLE 3

| User | Preferred vehicle light working mode |
|------|--------------------------------------|
| User A | Shine red during a voice conversation |
| User B | Displayed in a water flowing light form during a voice conversation |
| . . . | . . . |

It should be understood that the correspondence between the users and the preferred vehicle light working modes shown in Table 3 is merely an example. This is not limited in embodiments.

For example, when the in-vehicle light system determines, based on the user information, of the front passenger area, collected by the camera, that the user in the front passenger area is the user A, and the user A is currently interacting with the in-vehicle voice assistant, the in-vehicle light system may control the vehicle light in the front passenger area to shine red.

In an embodiment, if a signal that is obtained by the in-vehicle light system and that is collected by a microphone in an area is an audio signal, the in-vehicle light system may further control, based on a parameter of the audio signal, an interior light in the area to work. For example, a user B on the left side of the second row is playing Song 1 on a mobile phone. After obtaining the audio signal corresponding to Song 1, the in-vehicle light system may control, based on a beat (or a rhythm) and a mood (for example, happiness or sadness) of Song 1, a type of the song (for example, rock, country, heavy metal, pop, or folk) or a cover color of an album of Song 1, the vehicle light on the left side of the second row to work.

For example, the beat of Song 1 may be "1234567" in a digital profile in a music score of Song 1 (the corresponding letter profile represents "DO RAI MI FA SO LA XI") and may correspond to different vehicle light colors. In a playing process of Song 1, the in-vehicle light system may determine a corresponding ambient light color based on a digital profile corresponding to lyrics, so as to control a change of the ambient light color.

For example, the in-vehicle light system may determine the mood of the current song based on lyrics of Song 1. For example, Song 1 is a happy song or a sad song. If Song 1 is the happy song, the in-vehicle light system may control the ambient light on the left side of the second row to display a warm hue. If Song 1 is the sad song, the in-vehicle light system may control the ambient light on the left side of the second row to display a cool hue.

For example, the in-vehicle light system may further control, based on the type of Song 1, the vehicle light on the left side of the second row to work. The in-vehicle light system may obtain a correspondence between different types of music and a vehicle light working mode. For example, when Song 1 is rock music, the in-vehicle light system may control the ambient light on the left side of the second row to be displayed in a water flowing light form. For another example, when Song 1 is folk music, the in-vehicle light system may control the ambient light on the left side of the second row to display a warm hue; or when Song 1 is a heavy metal music, the in-vehicle light system may control the ambient light on the left side of the second row to display a cool hue.

In an embodiment, the correspondence between the parameter of the audio signal and the vehicle light working mode may be set before delivery of the vehicle, or may be set by the user. This is not limited in embodiments.

In an embodiment, the audio signal may be music, and the in-vehicle light system may determine first information of the music based on a first parameter of the audio signal, where the first information may be one or more of a song name, a singer name, or a name of an album in which the music is located.

For example, the in-vehicle light system may determine, based on lyric information in the audio signal, the song name corresponding to the music, and control, based on a mapping relationship between the song name and a vehicle light working mode, a vehicle light in a corresponding area to work.

In an embodiment, the in-vehicle light system can determine, in a timely manner, an area in which a user is in conversation with the voice assistant, so as to drive the ambient light in the corresponding area. The user can quickly understand and determine, based on the change of the ambient light in different areas, the area in which the voice assistant selects to be in conversation with the user. This can provide a sense of ritual of face-to-face communication for the user in different areas, fully considers feelings of members in the vehicle, and improves man-machine interaction experience.

The foregoing describes, with reference to FIGS. 5A-7, schematic diagrams of effects of the ambient lights in the distributed speech scenarios. The following shows, with reference to FIG. 8 to FIG. 11, a process in which the ambient light changes with a temperature according to embodiments.

Figure 8:
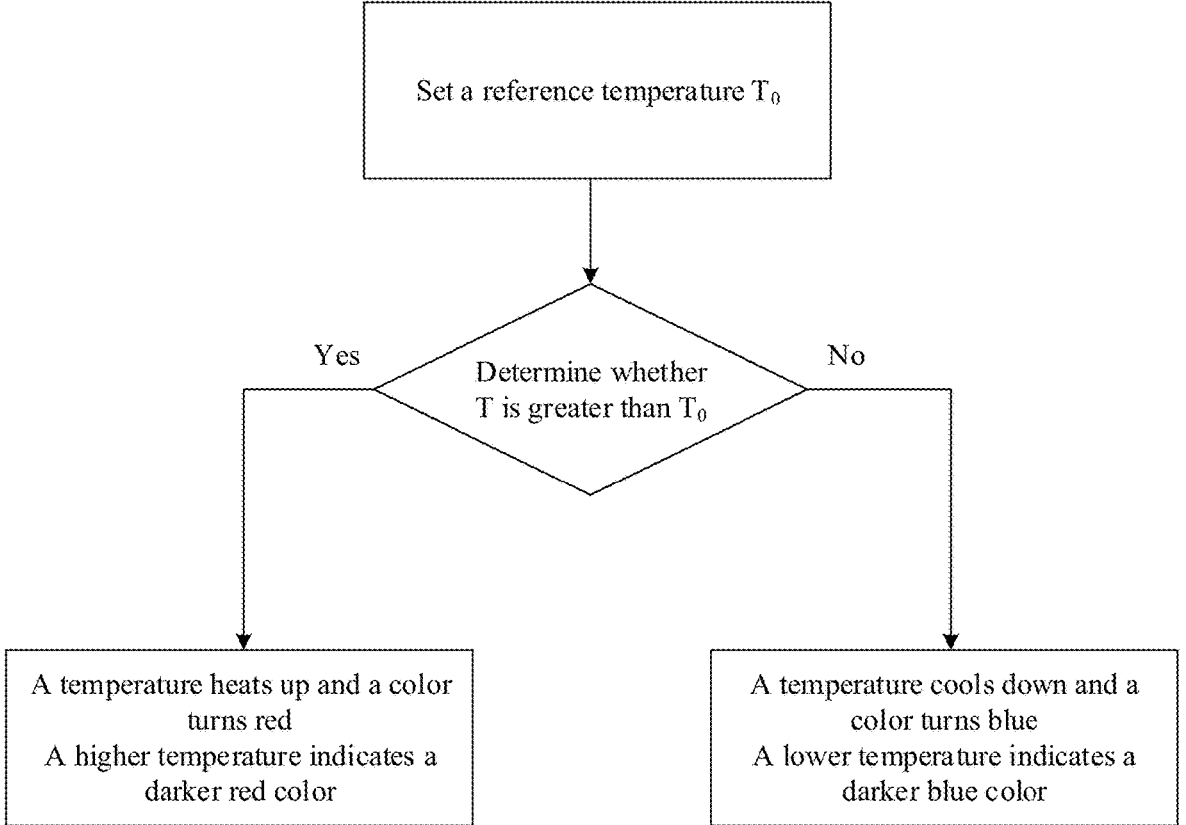
FIG. 8 is a schematic flowchart of changing an ambient light with a temperature according to an embodiment.

FIG. 8 is a schematic flowchart of changing an ambient light with a temperature according to an embodiment. An in-vehicle light system may obtain a reference temperature T0. When a temperature T of an area is lower than the reference temperature T0, an ambient light around the area may turn blue, and the color gradually becomes darker as the temperature cools down; or when a temperature T of an area is higher than the reference temperature T0, an ambient light around the area may turn red, and the color gradually becomes darker as the temperature heats up.

In this embodiment, the color of the ambient light may change with the temperature in the area, so that a user can intuitively feel a temperature change of the area in which the user is located, thereby helping the user accurately control the temperature of the area.

In an embodiment, the reference temperature may be preset, or may be set by the user. This is not limited in embodiments.

In an embodiment, the in-vehicle light system may further obtain reference temperatures of different areas, for example, a reference temperature T0 of a driver area, a reference temperature T1 of a front passenger area, a reference temperature T2 of a second-row-left-side area, and a reference temperature T3 of a second-row-right-row area. The second-row-left-side area is used as an example. When a temperature T of the second-row-left-side area is higher than the reference temperature T2, an ambient light around the second-row-left-side area may turn blue, and the color gradually becomes darker as the temperature cools down; or when a temperature T of the second-row-left-side area is higher than the reference temperature T2, an ambient light around the area may turn red, and the color gradually becomes darker as the temperature heats up.

In this embodiment, users in different areas may have different reference temperatures. This can meet requirements of the users in the different areas. For example, an elderly person expects that a temperature of an area is not excessively low, and the user may set a reference temperature of the area in which the elderly person is located to 28 degrees Celsius (° C.). In this way, when the temperature of the area in which the user is located is lower than the reference temperature, an interior ambient light may turn blue to notify the user that the temperature is excessively low, so that the user adjusts the temperature of the area in which the user is located. A young person expects that a temperature of an area is not excessively high, the user may set a reference temperature of the area in which the young person is located to 23° C. In this way, when the temperature of the area in which the user is located is higher than the reference temperature, an interior ambient light may turn red to notify the user that the temperature is higher than the reference temperature, so that the user adjusts the temperature of the area in which the user is located.

In an embodiment, with reference to the schematic diagram of the structure shown in FIG. 4, the vehicle may be divided into the driver area, the front passenger area, the second-row left-side area, and the second-row right-side area. A temperature sensor 1 is disposed in the driver area, a temperature sensor 2 is disposed in the front passenger area, a temperature sensor 3 is disposed in the second-row left-side area, and a temperature sensor 4 is disposed in the second-row right-side area. The temperature sensor 1, the temperature sensor 2, the temperature sensor 3, and the temperature sensor 4 may respectively send a detected temperature value 1, temperature value 2, temperature value 3, and temperature value 4 corresponding to the VIUs. After receiving the temperatures detected by the temperature sensors, the VIUs may release a signal corresponding to the temperature value 1, a signal corresponding to the temperature value 2, a signal corresponding to the temperature value 3, and a signal corresponding to the temperature value 4 on the ring network.

If the CDC obtains the reference temperature T0, after receiving signals corresponding to a plurality of temperature values, the CDC may separately determine whether the temperature values are higher than the reference temperature. For example, when the CDC determines that the temperature value 1 is higher than the reference temperature T0, the CDC may release the signal that carries the driver area position information on the ring network. After receiving the signal that carries the driver area position information, the VIU 1 may drive the ambient light around the driver area to turn red.

If the CDC obtains reference temperatures of a plurality of different areas, after receiving the signals corresponding to the plurality of temperature values, the CDC may separately compare a temperature detected by a temperature sensor of an area with a reference temperature of the area. For a specific process, refer to the descriptions in the foregoing embodiment. Details are not described herein again.

It should be understood that descriptions are provided in the foregoing embodiment by using an example in which the color of the ambient light turns red when the temperature is higher than the reference temperature, and the color of the ambient light turns blue when the temperature is lower than the reference temperature. This is not limited in embodiments. For example, the user may further set the color (or the change mode) of the ambient light when the temperature of the area is higher than the reference temperature and the color (or the change mode) of the ambient light when the temperature of the area is lower than the reference temperature.

It should be further understood that, for a schematic diagram of an effect of the ambient light changing with the temperature, refer to the schematic diagrams of the effects shown in FIGS. 5A-5D.

In an embodiment, before controlling a vehicle light in a corresponding area to work, the in-vehicle light system may further first obtain user information of the area. The user information may be identity information of the user. For example, the in-vehicle light system may determine, based on image information collected by a camera, that a user in the driver area is a user A.

The in-vehicle light system may determine a vehicle light change mode preferred by the user A. For example, the in-vehicle light system may obtain a correspondence between each of a plurality of users and an ambient light change mode preferred by the user. For example, a user A prefers to a red ambient light when a temperature value of an area in which the user A is located is higher than a preset temperature value, or the user A prefers to a blue ambient light when a temperature value of an area in which the user A is located is lower than a preset temperature value. For another example, a user B prefers to an orange ambient light when a temperature value of an area in which the user B is located is higher than a preset temperature value, or a user B prefers to a purple ambient light when a temperature value of an area in which the user B is located is lower than a preset temperature value.

In this case, when obtaining that the temperature value of the driver area is higher than the preset temperature value and the user in the driver area is the user A, the in-vehicle light system controls the ambient light in the driver area to be red.

In an embodiment, the correspondence between the user information and the ambient light change mode preferred by the user may be bound to information about a logged-in account on the vehicle. When the user A drives another vehicle, if the vehicle is logged in to by using the account, the vehicle may also correspondingly obtain the correspondence. In this way, the user does not need to set the correspondence on each vehicle, which helps reduce user operations and improve user experience.

Figure 9:
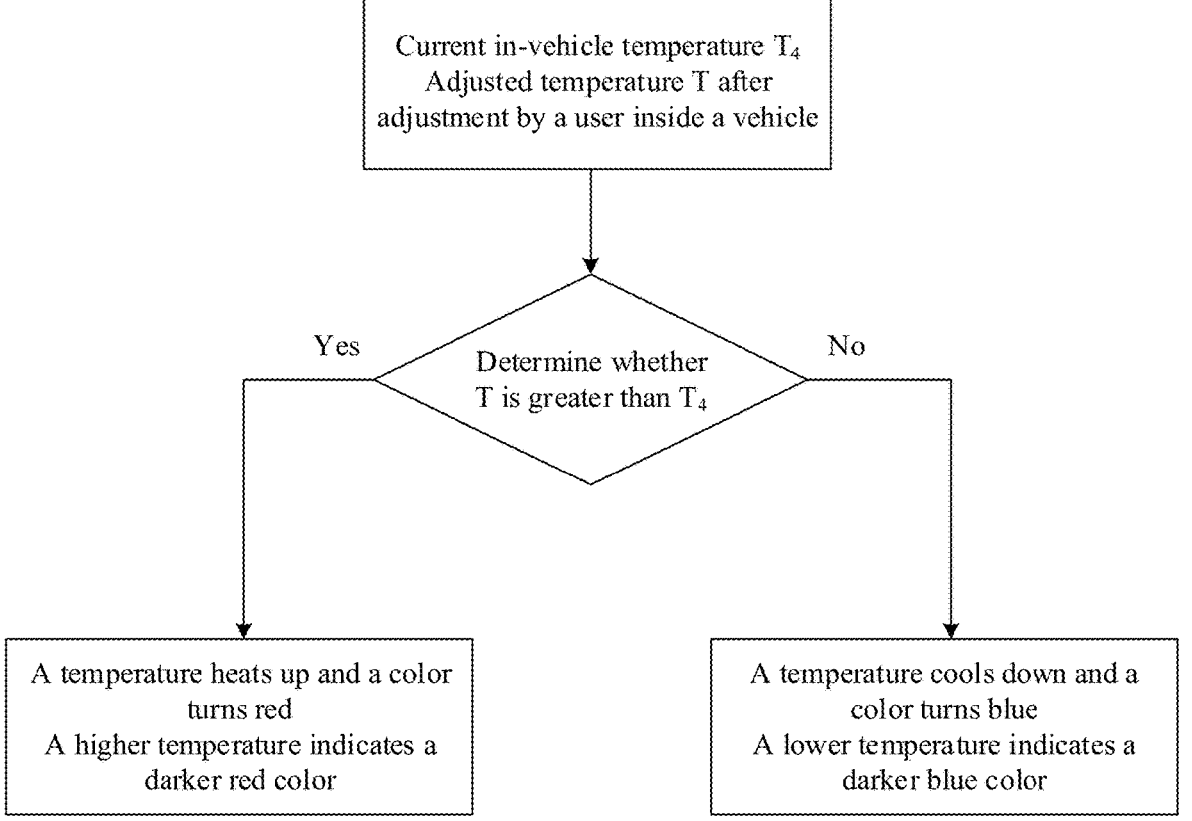
FIG. 9 is a schematic flowchart of changing an ambient light with a temperature adjusted by a user according to an embodiment.

FIG. 9 is a schematic flowchart of changing an ambient light with a temperature adjusted by a user according to an embodiment. A user in an area may adjust a temperature by using an in-vehicle voice assistant, a large central console screen, or a temperature adjustment knob. When an adjusted temperature T is higher than a current in-vehicle temperature T4, an in-vehicle light system may determine that the user currently intends to heat up the temperature, and drive an ambient light in the area to change to a warm hue; or when an adjusted temperature T is lower than a current in-vehicle temperature T4, the in-vehicle light system may determine that the user currently intends to cool down the temperature, and drive an ambient light in the area to change to a cool hue.

In an embodiment, when the adjusted temperature is higher than the current in-vehicle temperature, the higher the adjusted temperature value is, the deeper the color may be. When the adjusted temperature is lower than the current in-vehicle temperature, the lower the adjusted temperature value is, the deeper the color may be.

In an embodiment, the in-vehicle light system may further store a correspondence between a temperature value and a corresponding ambient light color. For example, Table 4 shows a correspondence between a temperature value and an ambient light color.

TABLE 4

| Temperature value | Ambient light color |
| --- | --- |
| 20° C. | Blue |
| 21° C. | Green |
| 22° C. | Purple |
| 23° C. | Orange |
| 24° C. | Red |
| . . . | . . . |

It should be understood that Table 4 is merely an example, and a correspondence between the temperature value and the ambient light color is not specifically limited in embodiments. For example, there may also be a correspondence between a temperature range and an ambient light color, for example, [20° C., 22° C.) corresponds to blue, [22° C., 24° C.) corresponds to green, [24° C., 26° C.) corresponds to purple, [26° C., 28° C.) corresponds to orange, and [28° C., 30° C.) corresponds to red. In this way, after the user adjusts the temperature, the in-vehicle light system may drive the ambient light to display a color corresponding to the adjusted temperature.

It should be further understood that, for a schematic diagram of an effect of the ambient light changing with the temperature adjusted by the user, refer to the schematic diagrams of the effects shown in FIGS. 5A-5D.

It should be further understood that the in-vehicle light system may further control, based on preference of the user, the vehicle light to work. For a specific control process, refer to the descriptions in the foregoing embodiments. Details are not described herein again.

In an embodiment, when the vehicle detects that the user adjusts a temperature of an air conditioner in the driver area to T and the temperature is lower than the current in-vehicle temperature T4, the vehicle may further continue detecting that an air exhaust direction of an air outlet of the air conditioner is a first direction. In this case, the in-vehicle light system may control the ambient light in the driver area to be displayed in a water flowing light form, and the water flowing light form matches the first direction. For example, if the vehicle detects that the air exhaust direction in the air outlet of the air conditioner in the driver area is a direction of blowing from the front passenger area to the driver area, the in-vehicle light system may control the water flowing light at a steering wheel to present the right-to-left water flowing light form.

Figure 10:
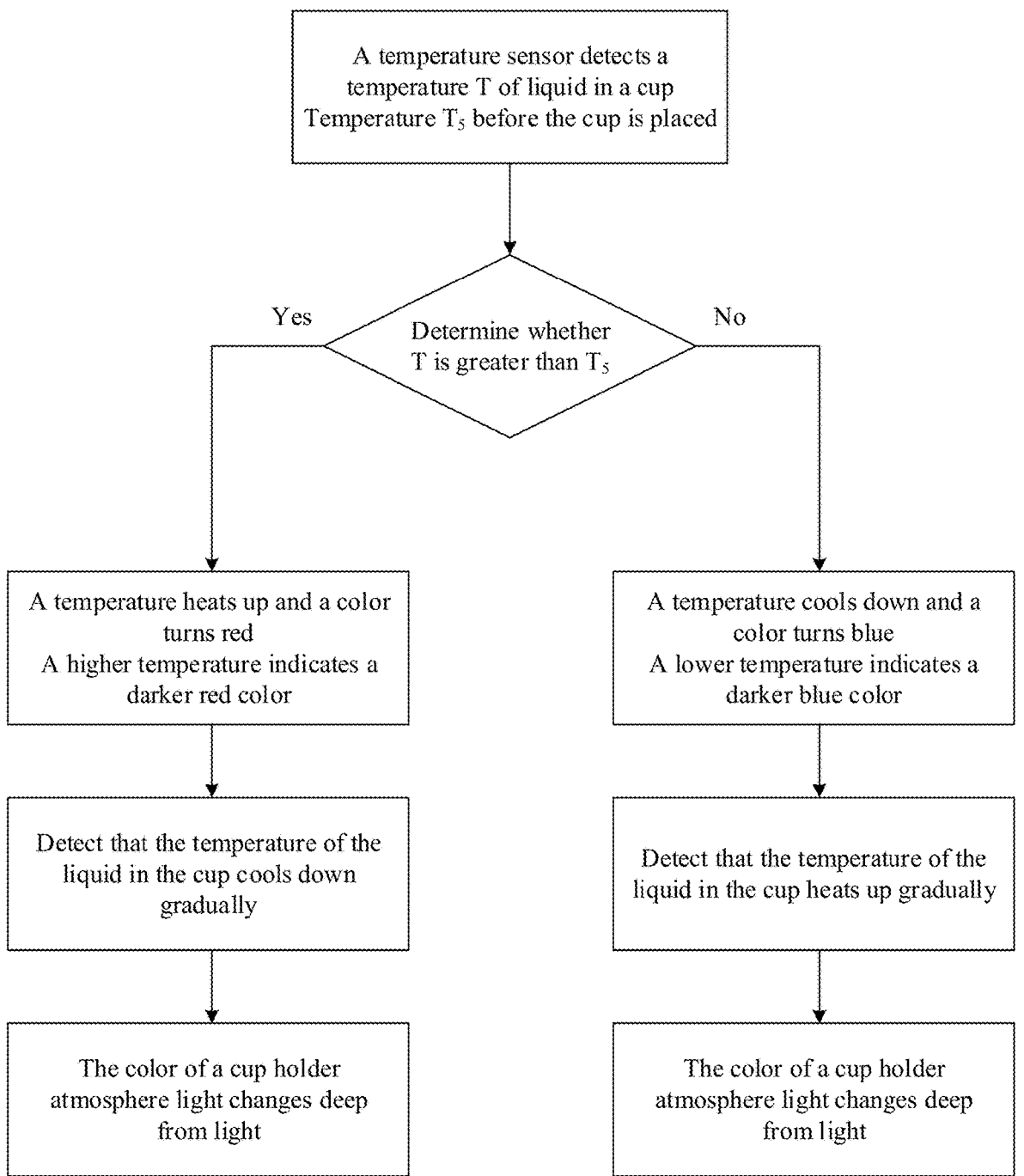
FIG. 10 is a schematic flowchart of changing an ambient light with a temperature of liquid in a cup according to an embodiment.

FIG. 10 is a schematic flowchart of changing an ambient light with a temperature of liquid in a cup according to an embodiment. An in-vehicle light system may further include a cup holder ambient light, and the cup holder ambient light may notify a user of a change of the temperature of the liquid in the cup by using a color change. For example, a cold drink may also be displayed in blue, and a hot drink may be displayed in red, so that the user knows the temperature of the liquid in the cup at any time.

A temperature sensor at a bottom of a cup holder detects a difference between the temperature T of the liquid in the cup and a temperature T5 before the cup is placed. If T is greater than T5, the temperature of the liquid in the cup after placement heats up compared with the temperature before placement, and the cup holder ambient light can be changed to a warm hue (for example, red). Further, a higher temperature indicates a darker color. The temperature sensor at the bottom of the cup holder may continue detecting the temperature T of the liquid in the cup after placement. When the temperature of the liquid in the cup gradually cools down, the color of the cup holder ambient light changes from deep to light (for example, the ambient light color changes from dark red to light red as the temperature gradually cools down).

If T is less than T5, the temperature of the liquid in the cup after placement cools down compared with the temperature before placement, and the cup holder ambient light may change to a cool hue. Further, a lower temperature indicates a darker color. The temperature sensor at the bottom of the cup holder may continue detecting the temperature T of the liquid in the cup after placement. When the temperature of the liquid in the cup gradually heats up, the color of the cup holder ambient light changes from deep to light (for example, the ambient light color changes from dark blue to light blue as the temperature gradually heats up).

In this embodiment, after the hot drink or the cold drink is placed in the cup holder, the user can be notified of the temperature of the liquid in the cup by using the color change of the cup holder ambient light. For example, when the user sees that the cup holder ambient light is dark red, the user can avoid touching the cup, thereby avoiding a scald of the user. In a process in which the hot drink cools down or the cold drink heats up to a room temperature, the color of the cup holder ambient light may gradually change from deep to light, so that the user can learn a change state of the temperature of the liquid in the cup in a timely manner.

Figure 11:
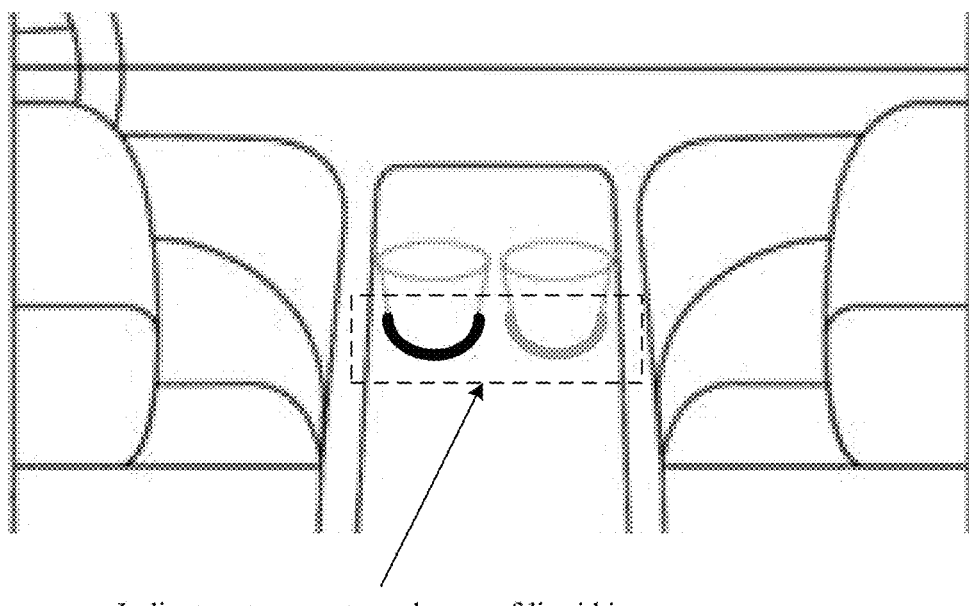
FIG. 11 shows a process in which an ambient light changes with a temperature according to an embodiment.

FIG. 11 is a schematic diagram of an effect of the ambient light changing with the temperature of the liquid in the cup.

The foregoing describes, with reference to FIG. 8 to FIG. 11, the process in which the ambient light changes with the temperature according to embodiments. The following describes, with reference to FIG. 12 to FIG. 15, a process in which the ambient light changes with a driving intent of the user in a driving process of the user.

Figure 12:
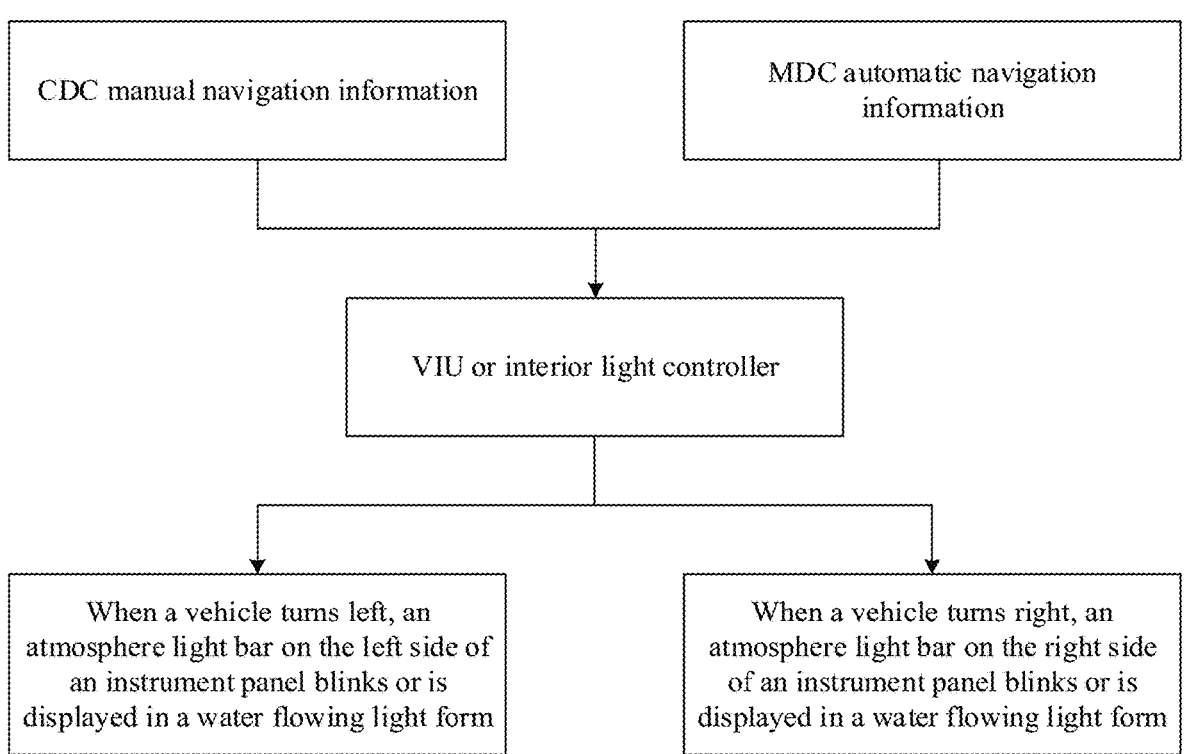
FIG. 12 is a schematic flowchart of changing an ambient light with a turn of a vehicle according to an embodiment.

FIG. 12 is a schematic flowchart of changing an ambient light with a turn of a vehicle according to an embodiment. For example, when navigation of the vehicle displays a turn (for example, a left turn, a right turn, or a U-turn) is required, strip lights on the left and right sides of an instrument panel blink in advance or indicate by using a left-to-right water flowing light to notify a user that the vehicle is about to turn. For example, when the user is notified through navigation to turn left, an in-vehicle light system may drive the ambient strip light on the left side of the instrument panel to blink or be displayed in the water flowing light form. For another example, when the user is notified through navigation to turn right, an in-vehicle light system may drive the ambient strip light on the right side of the instrument panel to blink or be displayed in the water flowing light form.

For example, with reference to the schematic diagram of the structure shown in FIG. 4, when CDC manual navigation information or MDC automatic navigation information indicates that the vehicle is about to turn left, the CDC or the MDC may release a signal that carries left-turn information on the ring network. When receiving the signal that carries the left-turn information, the VIU may drive the ambient strip light on the left side of the instrument panel to blink or be displayed in the water flowing light form.

It should be understood that this scenario is applicable to autonomous driving or manual driving. The in-vehicle light system drives, by using turn information in the navigation, the ambient light to blink in advance, or notify the user by using a water flowing light.

In an embodiment, the in-vehicle light system may drive the ambient light with reference to the turn information and distance information in the navigation. For example, when a distance to an intersection to be turned reaches a preset distance (for example, 20 meters (m)), the ambient light is driven to blink in advance, or the user is notified by using the water flowing light.

Figure 13:
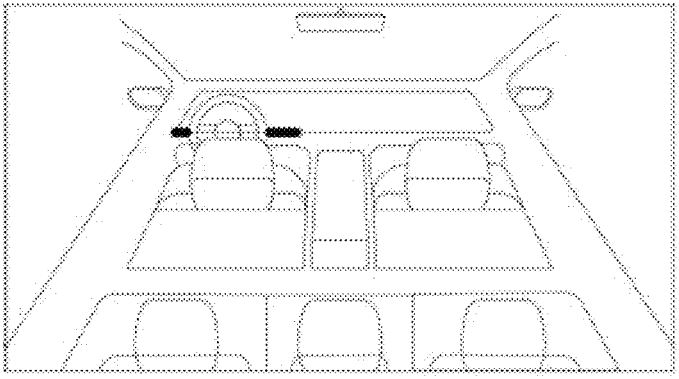
FIG. 13 is a flowchart of an effect of an ambient light changing with a turn of a vehicle according to an embodiment.

FIG. 13 is a flowchart of an effect of the ambient light changing with the turn of the vehicle. As shown in FIG. 13, the ambient strip light on the left side of the instrument panel blinks when the vehicle is about to turn left. As shown in FIG. 13, the ambient strip light on the right side of the instrument panel blinks when the vehicle is about to turn right.

Figure 14:
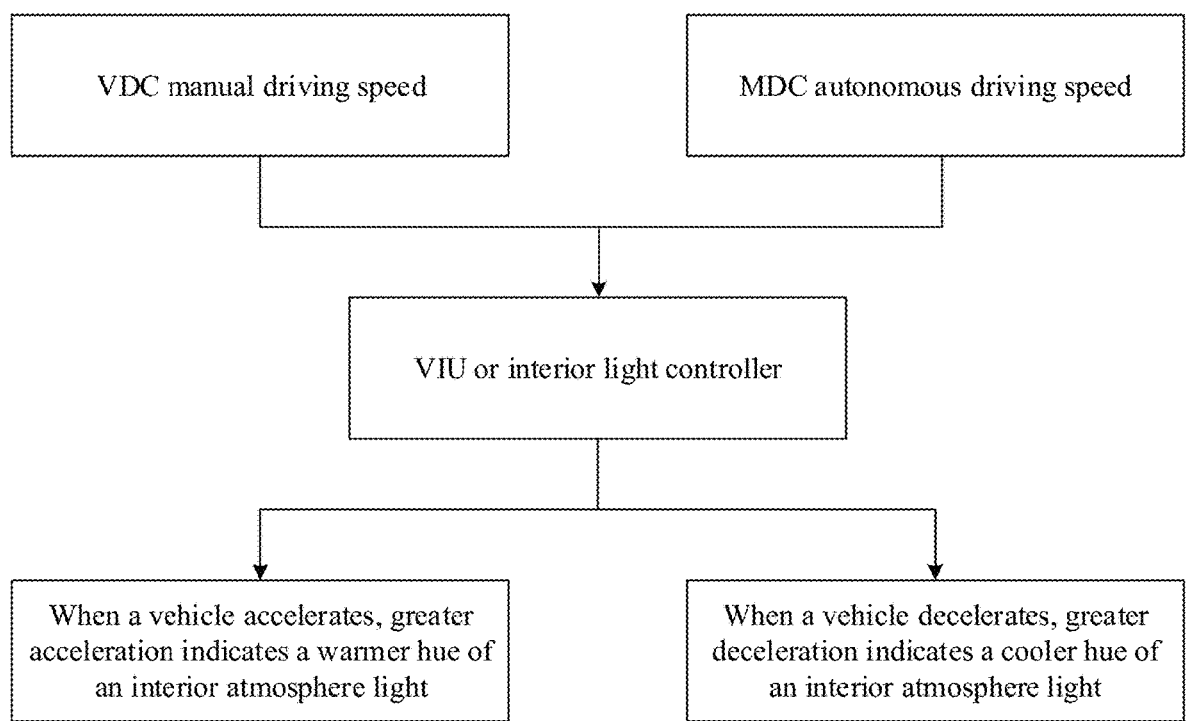
FIG. 14 is a schematic flowchart of changing an ambient light with a vehicle acceleration/deceleration state according to an embodiment.

FIG. 14 is a schematic flowchart of changing an ambient light with a vehicle acceleration/deceleration state according to an embodiment. Autonomous driving is used as an example. When an autonomous driving vehicle accelerates, the interior ambient light may gradually become warmer; or when the autonomous driving vehicle decelerates, the interior ambient light may gradually become cooler. As the vehicle accelerates and decelerates, the ambient light changes a color in real time, or is displayed in a water flowing light form. For example, a higher vehicle speed indicates a higher water flow speed.

It should be understood that this scenario is also applicable to manual driving. A user is notified of the vehicle acceleration/deceleration state by using a cool/warm hue change of the interior ambient light.

Figures 15, 16:
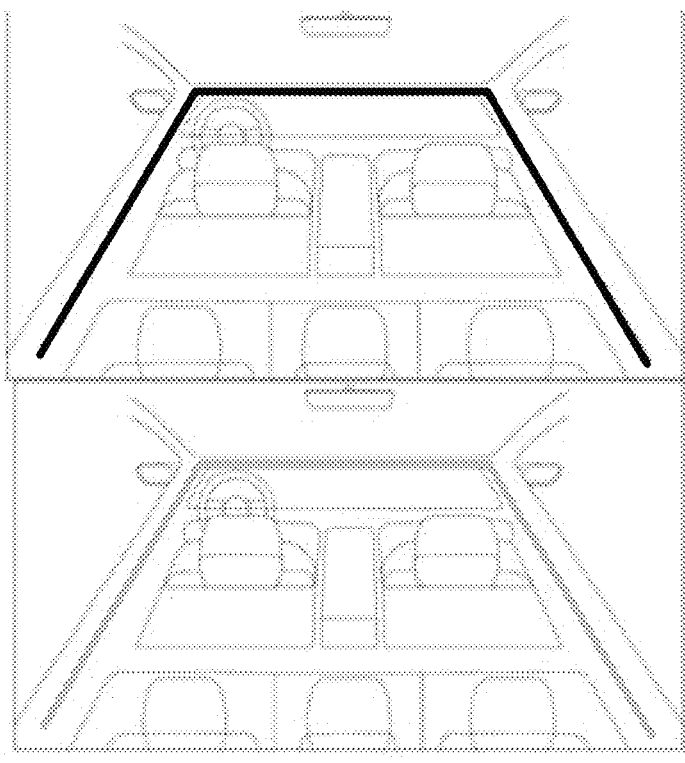
FIG. 15 is a schematic diagram of an effect of an ambient light changing with a vehicle acceleration/deceleration state according to an embodiment.
FIG. 16 is a schematic flowchart of performing a blind spot prompt by using an ambient light according to an embodiment.

FIG. 15 is a schematic diagram of an effect of the ambient light changing with the vehicle acceleration/deceleration state according to an embodiment.

In an embodiment, in an autonomous driving process, if the vehicle needs to be taken over by a driver, or auxiliary driving alarm information such as automatic emergency braking (AEB) emergency braking occurs, the in-vehicle light system may drive the interior ambient light to blink, so as to notify the user.

In this embodiment, the ambient light actively detects an autonomous driving operation intent in the autonomous driving scenario, and notifies the driver in advance in a lighting signal. This enhances man-machine mutual trust, and relieves psychological burden of a passenger.

The foregoing describes, with reference to FIG. 12 to FIG. 15, the process in which the ambient light changes with the driving intent of the user in the driving process of the user. The following describes, with reference to FIG. 16 to FIG. 18, a process of performing a blind spot prompt by using the ambient light.

FIG. 16 is a schematic flowchart of performing a blind spot prompt in a driving process by using an ambient light according to an embodiment. In the running process of the vehicle, after the vehicle performs a left-turn or right-turn action, when it is detected that there is a vehicle approaching near from behind, the ambient light at an instrument panel may be emitted from the instrument panel in a form of a water flowing light, and flows to a left door panel from the instrument panel to the left, or flow to the right side of the instrument panel to the right, to guide driver's eyes to a rear-view mirror. This improves driver's attention.

For example, when the vehicle turns left, a radar behind the left can send collected data to a corresponding VIU. The VIU releases a signal corresponding to the data on a ring network. After receiving the signal, a VDC may determine distance information of the vehicle approaching from behind. When the distance information meets a preset condition (for example, a distance between the vehicle approaching from behind and the current vehicle is less than or equal to 10 meters), the VDC may release, on the ring network, a signal presenting a left flow from the instrument panel to the left door panel. In this way, when the VIU receives the signal, the ambient light on the left side of the instrument panel can be driven to flow to the left door panel.

Figure 17:
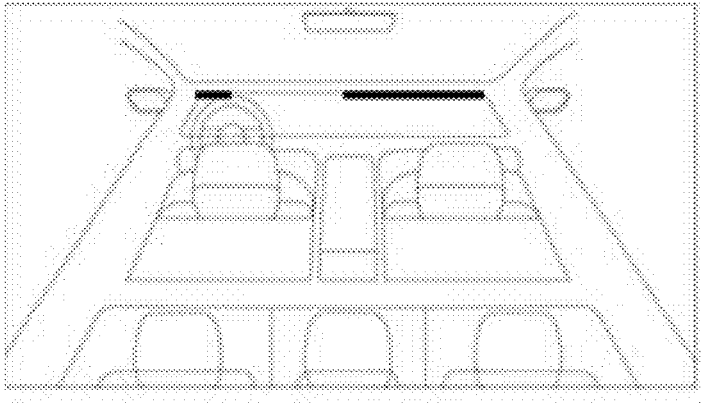
FIG. 17 is a flowchart of an effect of performing a blind spot prompt by using an ambient light according to an embodiment.

FIG. 17 is a flowchart of an effect of performing the blind spot prompt by using the ambient light in the driving process. As shown in FIG. 17, when the vehicle turns left and the distance to the vehicle approaching from behind meets the preset condition, the ambient strip light on the left side of the instrument panel emits from the instrument panel in the form of the water flowing light and flows left to the left door panel. When the vehicle turns right and the distance to the vehicle approaching from behind meets the preset condition, the ambient strip light on the right side of the instrument panel emits from the instrument panel in the form of the water flowing light and flows right to a right door panel.

Figure 18:
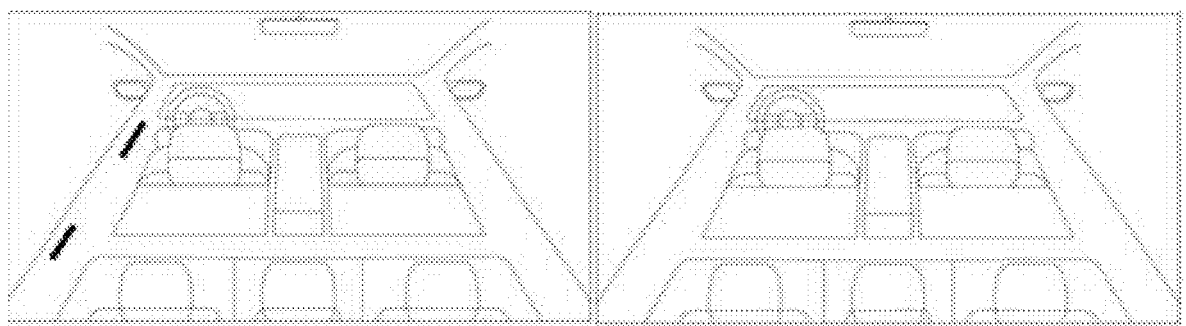
FIG. 18 is a diagram of an effect of performing a door opening anti-collision prompt by using an ambient light according to an embodiment.

FIG. 18 is a diagram of an effect of performing a door opening anti-collision prompt by using an ambient light according to an embodiment. When a vehicle stops, the ambient light on a vehicle door indicates a state of a pedestrian or a vehicle approaching from behind. For example, when the ambient light on the vehicle door turns on, it indicates that the pedestrian or the vehicle passes by, and the vehicle door is automatically locked and cannot be opened in this case. After the pedestrian or the vehicle passes by, the ambient light on the vehicle door turns off, and the vehicle door is automatically unlocked.

In an embodiment, the anti-collision prompt may be performed by using a color change of the ambient light on the vehicle door. For example, when the ambient light on the vehicle door turns on and shines red, it indicates that the pedestrian or the vehicle passes by, and the vehicle door is automatically locked and cannot be opened in this case. After the pedestrian or the vehicle passes by, the ambient light on the vehicle door changes from red to green, and the vehicle door is automatically unlocked.

In an embodiment, if a warning is triggered in a sentry mode, the interior ambient light may blink as a warning light (for example, a red/blue warning light blinks).

In an embodiment, when the vehicle is in a stationary state and position information of an object around a first vehicle door meets a preset condition, an in-vehicle light system may control a first vehicle light to work. The first vehicle light is a vehicle light in a first area in which the first vehicle door is located. For example, the preset condition may be that a distance between the object around the first vehicle door and the first vehicle door is less than or equal to a preset distance (for example, 1 m).

In an embodiment, when the vehicle is in the stationary state, the position information of the object around the first vehicle door meets the preset condition and the vehicle detects an operation that the user is about to open the vehicle door, the in-vehicle light system may control the first vehicle light to work. For example, the vehicle may collect image information by using a camera, and may determine, based on the collected image information, that the user is about to open the first vehicle door. For example, there may be a touch sensor on a door handle of the first vehicle door. When detecting a touch operation of the user, the touch sensor may determine that the user is about to open the first vehicle door.

In an embodiment, before the in-vehicle light system controls the first vehicle light to work, the in-vehicle light system may further first determine that the first area includes the user. For example, the in-vehicle light system may learn, based on the image information collected by the camera, whether the user exists in the current first area. For another example, the in-vehicle light system may further learn, by using a pressure sensor under a seat in the first area, whether the user exists in the current first area. If the user exists in the first area, when the vehicle is in the stationary state and the position information of the object around the first vehicle door meets the preset condition, the in-vehicle light system may control the first vehicle light to work. If no user exists in the first area, the in-vehicle light system may control the first vehicle light not to be turned on (or not to work). This can effectively avoid a waste of power.

In an embodiment, when the in-vehicle light system controls the first vehicle light to work, the vehicle may further lock the first vehicle door.

In an embodiment, the first vehicle light includes a first interior light and a first exterior light. That the in-vehicle light system controls the first vehicle light to work includes: The in-vehicle light system controls the first interior light to work in a first mode and controls the first exterior light to work in a second mode. The first mode notifies a user inside the vehicle that the object outside the first vehicle door passes by, and the second mode notifies a user outside the vehicle that the user is about to open the vehicle door. For example, when the vehicle is in the stationary state and the position information of the object outside the first vehicle door meets the preset condition, the in-vehicle light system may control the first interior light in the first area to shine red. In this way, the user inside the vehicle can be notified that the object passes outside the vehicle door, thereby warning the user inside the vehicle. In addition, the in-vehicle light system may control the first exterior light to display yellow. In this way, the pedestrian or the vehicle outside the vehicle can be notified that the first door of the vehicle is about to open, so that the pedestrian or the vehicle outside the vehicle gets far away from the first door.

In an embodiment, before controlling the first vehicle light to work, the in-vehicle light system may further first obtain user information (for example, identity information of the user) in the first area; can read a preset matching relationship between the user information and the vehicle light working mode based on the user information; and further control the first vehicle light to work in the obtained working mode through matching. For example, a pre-warning color preferred by a user A is red, and a pre-warning color preferred by a user B is purple. In this case, when the vehicle is in the stationary state and the position information of the object around the first vehicle door meets the preset condition, the in-vehicle light system may determine, based on the image information obtained by the camera, that the user in the first area is the user B, and further determine, based on the matching relationship, that the pre-warning color preferred by the user B is purple. The in-vehicle light system may control the first interior light in the first area to display purple, thereby pre-warning the user B.

The foregoing describes, with reference to FIG. 16 to FIG. 18, the process of performing the blind spot prompt by using the ambient light. The following describes, with reference to FIG. 19 to FIG. 21, an interior follow spotlight illumination process.

The in-vehicle light system in embodiments may include a follow spotlight. The follow spotlight may be one or more spot lights that can be freely turned, or a matrix vector light-emitting diode (LED) illuminating light.

Figure 19:
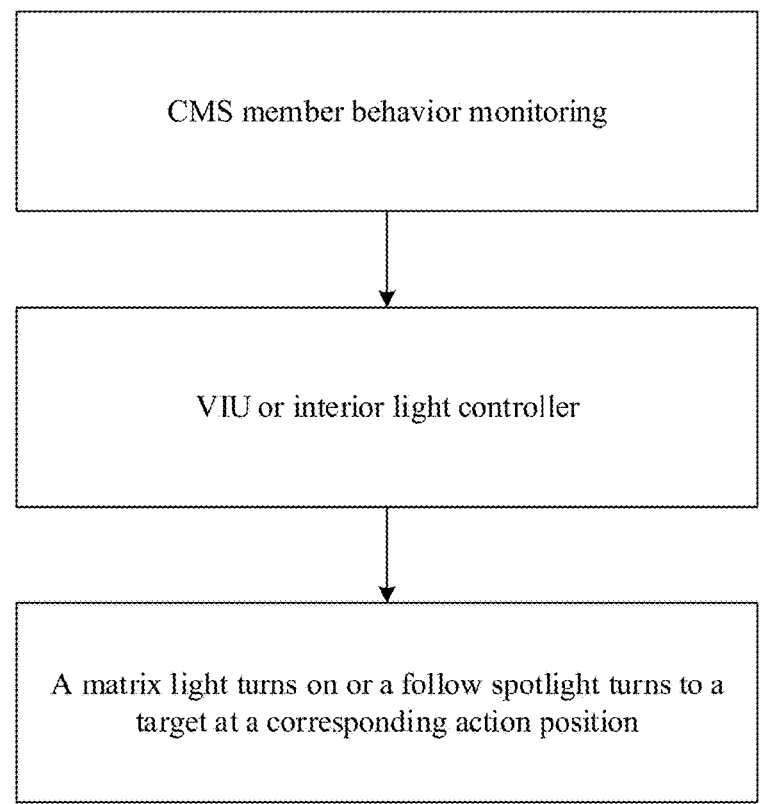
FIG. 19 is a schematic flowchart of controlling illumination of an interior follow spotlight according to an embodiment.

FIG. 19 is a schematic flowchart of controlling illumination of an interior follow spotlight according to an embodiment. A state of a member in a vehicle may be determined based on data collected by a camera monitor system (CMS), so as to drive the follow spotlight to automatically follow illuminating. For example, when a user gets an object in a rear trunk at night, the CMS may determine a position of the hand of the user based on image information collected by the camera, so that the follow spotlight can actively illuminate following action of the hand. For another example, when a user in an area picks up a book or a mobile phone, the CMS may determine a position of the book or a position of the mobile phone based on image information collected by the camera, so that the follow spotlight can actively illuminate following a direction of the book or the mobile phone. For another example, when a user in an area looks down to pick up an object, an in-vehicle light system may determine to turn on a foot bottom ambient light in the area.

It should be understood that the CMS may determine, based on the image information collected by the camera, the position of the hand of the user, the position of the book or the mobile phone at the hand of the user, and a process in which the user looks down to pick up the object may be implemented in a manner in the conventional technology.

Figure 20:
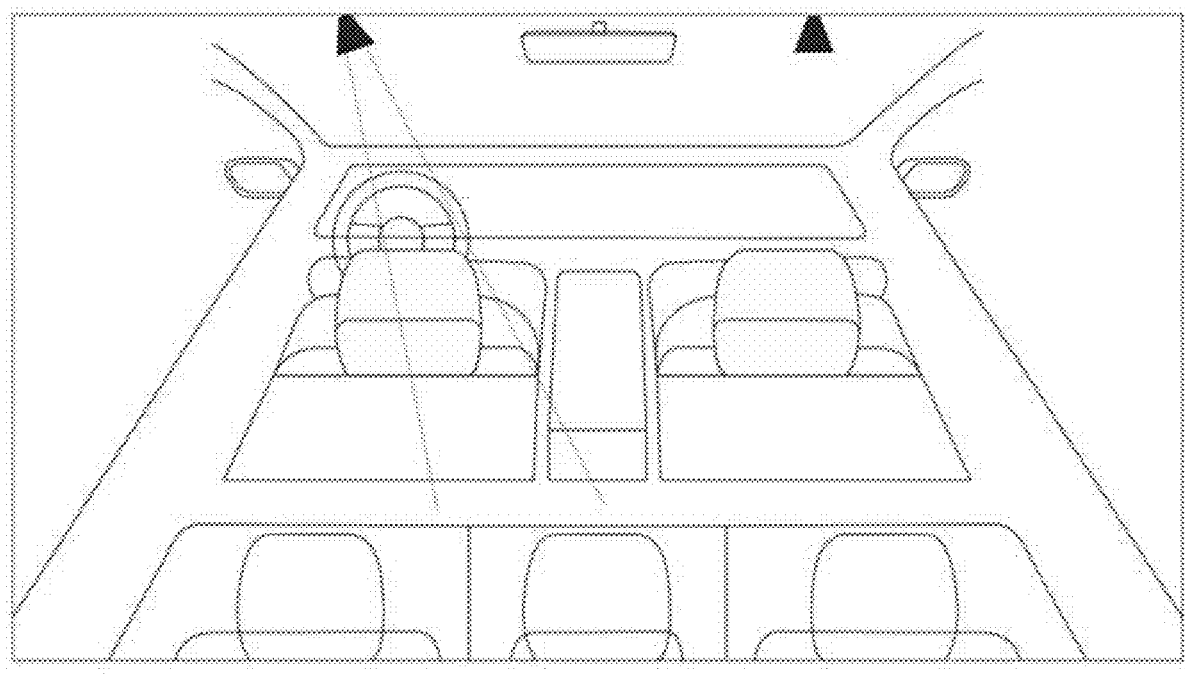
FIG. 20 is a diagram of an effect of controlling illumination of an interior follow spotlight according to an embodiment.

FIG. 20 is a diagram of an effect of controlling illumination of the interior follow spotlight.

In an embodiment, the in-vehicle light system can be associated with an application (app), like a mobile phone game or singing a song on a mobile phone, and change a lighting effect with a game or a song melody, thereby creating an immersive game and singing atmosphere. The follow spotlight included the in-vehicle light system can further follow an excellent member during a game or singing, bolstering a "protagonist" identity. In a multi-player game, a lighting signal at a corresponding seat blinks if a player wins a game, indicating that the game succeeds.

Figure 21:
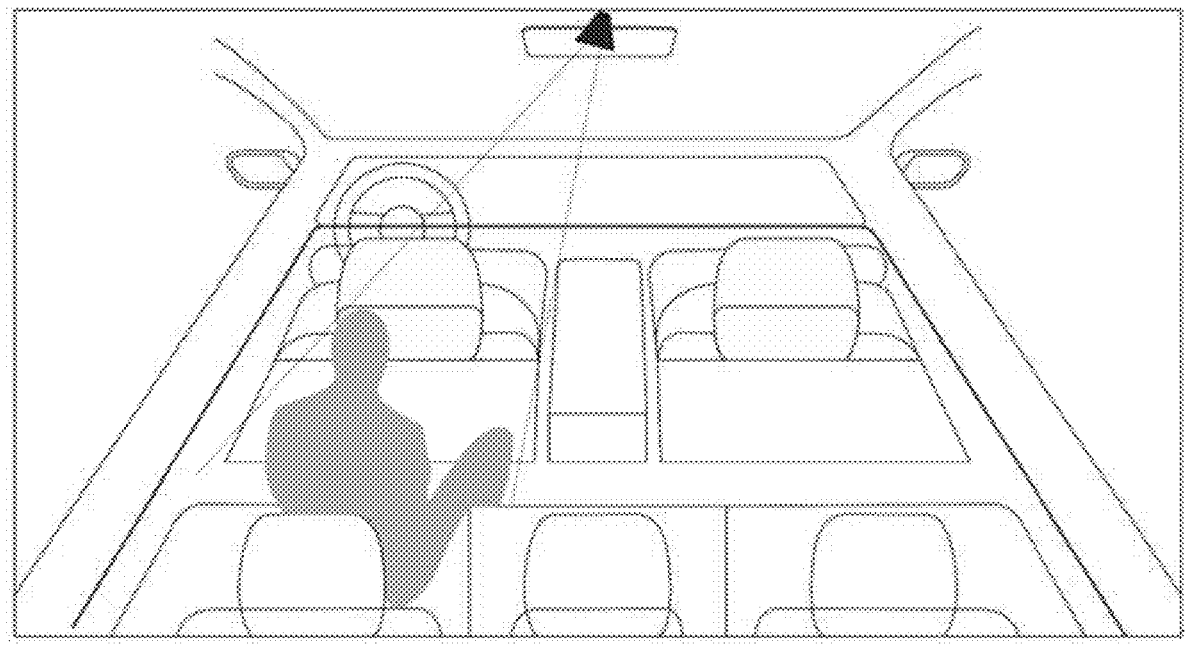
FIG. 21 is a diagram of another effect of controlling illumination of an interior follow spotlight according to an embodiment.

For example, FIG. 21 is a diagram of another effect of controlling illumination of the interior follow spotlight. A user A in a second-row-left-side area and a user B in a front passenger area play a same game on mobile phones. The in-vehicle light system may separately establish a connection to a mobile phone 1 of the user A and a connection to a mobile phone 2 of the user B, and determine, based on a distance and orientation information measured through short-range wireless communication (for example, Bluetooth or Wi-Fi), that the mobile phone 1 is located in the second-row-left-side area and the mobile phone 2 is located in the second-row-right-side area. When the player of the mobile phone 1 wins in the game, the follow spotlight may illuminate the user A.

In an embodiment, a camera outside the vehicle may collect a scenery picture outside the vehicle. An environment state of a current driving road is recognized by using an image recognition algorithm. For example, a main color in a scenery picture is extracted by using the algorithm, so that an in-vehicle light system can control an ambient light to display a corresponding color. For example, when a forest scene is recognized, the interior ambient light displays a forest color (for example, green); when an ocean is recognized, the interior ambient light displays an ocean color (for example, blue); and when a desert is recognized, the interior ambient light displays a desert color (for example, yellow).

In an embodiment, the interior ambient light may be in an echo state with the exterior decorative light, so as to implement synchronous rhythm inside and outside the vehicle.

For example, when the vehicle is in an accelerated state, the interior ambient light may be green, and the exterior decorative light may also be green. In this way, a user of another vehicle around the vehicle can determine that the vehicle is accelerating or decelerating, thereby pre-warning the surrounding vehicle.

In an embodiment, the interior ambient light and the exterior ambient light may be synchronized to indicate an assisted driving state or an autonomous driving state. For example, when the vehicle is in the autonomous driving state, the interior ambient light may be blue. In this case, the exterior decorative light may also be blue, so that another vehicle around the vehicle determines that the vehicle is in the autonomous driving state. Further, when the vehicle needs to be taken over by the user, the vehicle may control the color of the interior ambient light to switch from blue to red, so as to remind the user inside the vehicle that the vehicle is currently switched from the autonomous driving mode to a manual driving mode.

In an embodiment, the in-vehicle light system may write an intent of the current vehicle as a lighting signal, and execute the corresponding lighting signal by using a rear light. A vehicle approaching from behind can capture, by using a front-view camera, and analyze the lighting signal corresponding to a rear light of a front vehicle, so that an intent of the front vehicle can be displayed by using an interior light or a large screen of the vehicle approaching from behind, thereby achieving an objective of vehicle communication; or a front vehicle can capture light from the vehicle approaching from behind by using a rear-view camera, so that an intent of the vehicle approaching from behind is displayed by using an interior light or a large screen of the front vehicle, thereby achieving an objective of vehicle communication.

In an embodiment, the in-vehicle light system may further control the vehicle light to work in different modes (for example, a theater mode, a rest mode, a game mode, and a creation mode).

For example, in the theater mode, the in-vehicle light system may control a change of the interior ambient light based on a color change of a movie played on a large central console screen, to give the user immersive experience.

For example, in the rest mode, the vehicle may control brightness of the interior ambient light to decrease. In addition, the vehicle can adjust a seat, an aroma, and music in the vehicle, to relax.

For example, in the creation mode, because a reverberation effect inside the vehicle is good, when the user creates music, the in-vehicle light system may control, based on a beat (or a rhythm) of the music, the ambient light to work. For a specific implementation, refer to the description in the foregoing embodiments. Details are not described herein again.

In an embodiment, the in-vehicle light system may further project exterior light based on setting of the user or a scenario selected by the user. For example, some pictures are projected by using a headlight on a wall or on a road surface. For another example, parking to play a game, AR-HUD projection, and projection of a vehicle light into an environment may interact with each other, thereby creating a game atmosphere.

In an embodiment, the light system in the vehicle may further include a decorative light. The light system may be set based on a color on the user, an environment color, or a mood of the user and a preference of the user. For example, the light system can control the ambient light to better match user's wear.

In an embodiment, the vehicle may further create a courtesy effect by using the light system. For example, the light system can control light color, direction, and position to change with user's identity/position. For example, the vehicle detects that the user walks around the vehicle, the ambient light at a place that the user passes by is turned on, and the ambient light changes with a position of the user.

Figure 22:
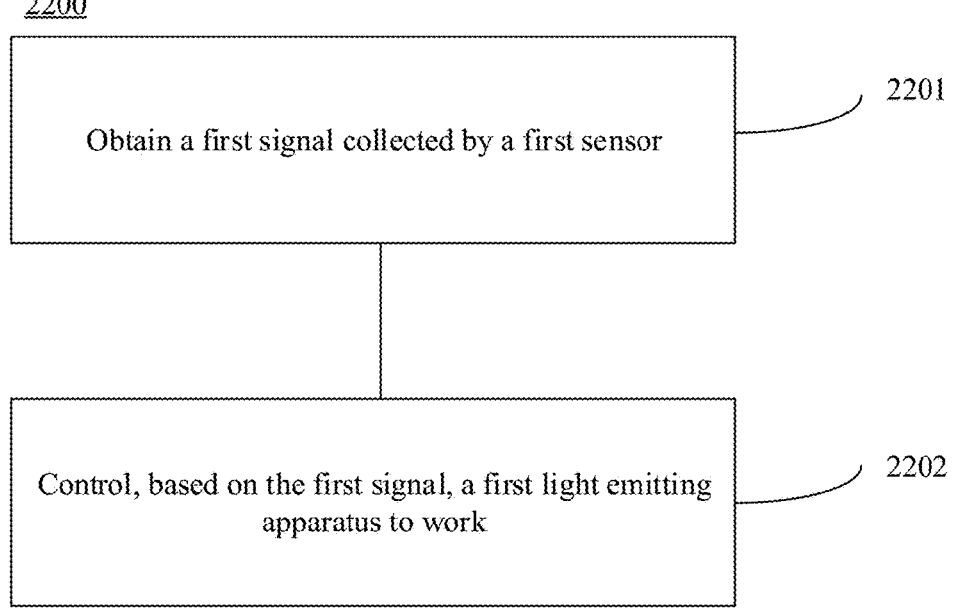
FIG. 22 is a schematic flowchart of a light system control method according to an embodiment.

FIG. 22 is a schematic flowchart of a light system control method 2200 according to an embodiment. The method 2200 is applied to a vehicle, the vehicle includes a plurality of areas, each of the plurality of areas includes at least one light emitting apparatus and at least one sensor of a first type, the plurality of areas include a first area, and the first area includes a first light emitting apparatus and a first sensor, a type of the first sensor is the first type, and the method 2200 includes the following steps.

S2201: The vehicle obtains a first signal collected by the sensor in the first area.

S2202: The vehicle controls, based on the first signal, the first light emitting apparatus to work.

In an embodiment, the vehicle can control, based on the first signal collected by the sensor located in the first area, the light emitting apparatus in the first area to work. This can give a user in the first area a sense of ritual of face-to-face interaction, fully consider feelings of members in different areas of the vehicle, and help improve intelligence of a light system, thereby helping improve user experience.

Optionally, a plurality of interior lights may include an exterior decorative light, an interior ambient light, a spot light, or an LED light.

Optionally, that the vehicle controls, based on the first signal, the first light emitting apparatus to work includes: The vehicle adjusts an ambient light based on a sound, where the sound includes one or more of a user voice instruction, music played in the vehicle, and a sound made when a video is played in the vehicle.

Optionally, the sensor of the first type is a sound source positioning apparatus, and the first signal includes a sound signal and information about a sound source position; and that the vehicle controls, based on the first signal, the first light emitting apparatus to work includes: When the sound source position is located in the first area, the vehicle controls the first light emitting apparatus to work.

Optionally, the sound source positioning apparatus may be a microphone array.

Optionally, the sensor of the first type is a sound collection apparatus, the plurality of areas further include a second area, the second area includes a second sensor, a type of the second sensor is the first type, and before the vehicle controls, based on the first signal, the first light emitting apparatus to work, the method further includes: The vehicle obtains a second signal collected by the second sensor; and that the vehicle controls, based on the first signal, the first light emitting apparatus to work includes: When determining, based on the first signal and the second signal, that a sound source is located in the first area, the vehicle controls the first light emitting apparatus to work.

For example, as shown in FIG. 5A, the plurality of areas may be the driver area, the front passenger area, the second-row left-side area, and the second-row right-side area. When a user in the driver area sends a voice signal, microphones in all the four areas may collect the voice signal and send the voice signal to a controller. If the controller determines that the voice signal is sent by the user located in the driver area, the controller can control an ambient light in the driver area to work. In this way, the vehicle can determine, in a timely manner by using sensors located in different areas, the area in which a voice assistant communicates with a user. The interior light can provide the sense of ritual of face-to-face communication for the user, and the user can quickly understand and determine, based on the change of the interior light, the area in which the voice assistant selects to communicate with the user. This fully considers the feelings of the members in the vehicle, and improves voice communication human-machine experience.

Optionally, the first sensor and the second sensor each may be a microphone.

Optionally, that the vehicle determines, based on the first signal and the second signal, that the user is located in the first area includes: The vehicle determines, based on signal strength of the first signal and signal strength of the second signal, that the user is located in the first area.

Optionally, before the vehicle controls the first light emitting apparatus to work, the method further includes: The vehicle determines a speech recognition state based on the first signal; and the vehicle controls the first light emitting apparatus to work includes: The vehicle controls, based on the speech recognition state, the first light emitting apparatus to work.

In an embodiment, the vehicle can determine the speech recognition state based on the collected first signal, and different speech recognition states can correspond to different working modes of the light emitting apparatus. In this way, in different speech recognition states, the user can determine, based on the change of the light emitting apparatus, the current speech recognition state of the voice assistant, thereby helping improve man-machine communication experience.

Optionally, the speech recognition state includes one or more of a speech wakeup state, a speech listening state, a speech thinking state, and a speech execution state.

It should be understood that, for the speech wakeup state, the speech listening state, the speech thinking state, and the speech execution state, refer to the descriptions in the foregoing embodiments. Details are not described herein again.

Optionally, the sensor of the first type is a sound collection apparatus, and that the vehicle obtains the first signal collected by the first sensor in the first area includes: The vehicle obtains an audio signal collected by the first sensor; and that the vehicle controls, based on the first signal, the first light emitting apparatus to work includes: The vehicle controls, based on a first parameter of the audio signal, the first light emitting apparatus to work.

In an embodiment, the vehicle can control, based on the parameter of the audio signal, the first light emitting apparatus to work. In this way, the first light emitting apparatus can change with the parameter, and create a different atmosphere for the user, thereby helping improve user experience.

Optionally, the audio signal is music, and the first parameter includes one or more of a beat, a tune, lyric information, and album cover color information of the music.

Optionally, the audio signal is music, and that the vehicle controls, based on the first signal, the first light emitting apparatus to work includes: The vehicle determines first information of the music based on the first parameter of the audio signal, where the first information includes one or more of a song name, a singer name, or a name of an album to which the music belongs; and controls, based on a mapping relationship between the first information and a working mode of the light emitting apparatus, the first light emitting apparatus to work in a second mode.

In an embodiment, the vehicle can determine the working mode of the first light emitting apparatus based on the correspondence between the first information of the music and the working mode of the light emitting apparatus. In this way, music preferred by the user and the working mode of the light emitting apparatus can be combined, thereby helping improve user experience.

Optionally, before the vehicle controls the first light emitting apparatus to work, the method further includes: The vehicle obtains user information of the user located in the first area; and obtains, based on the user information, light configuration information corresponding to the user information; and that the vehicle controls the first light emitting apparatus to work includes: The vehicle controls, based on the light configuration information, the first light emitting apparatus to work.

It should be understood that the light configuration information may be preset in the vehicle before delivery of the vehicle, or may be customized by the user. For example, the vehicle receives a setting instruction from the user, where the setting instruction includes a correspondence between different users and colors preferred by the users when the users communicate with the voice assistant. A user A prefers a blue ambient light when interacting with the voice assistant. A user B prefers a purple ambient light when interacting with the voice assistant.

Optionally, the sensor includes a temperature sensor, the first signal indicates a first temperature value, and that the vehicle controls, based on the first signal, the first light emitting apparatus to work includes: When the first temperature value is greater than a preset temperature value or when the first temperature value is less than a preset temperature value, the vehicle controls the first light emitting apparatus to work.

For example, as shown in FIG. 5A, the plurality of areas may be the driver area, the front passenger area, the second-row left-side area, and the second-row right-side area. A temperature sensor located in the driver area may collect a current temperature value (for example, 25° C. of the driver area. If a preset temperature value is 22° C., the vehicle may control an ambient light in the driver area to work in a first mode, so that the user intuitively feels that the temperature of the driver area is higher than the preset value. In this way, after feeling that the temperature of the driver area is higher than the preset temperature value, the user can cool down the temperature of the driver area.

Optionally, the sensor includes a temperature sensor, the first signal indicates a first temperature value, and that the vehicle controls, based on the first signal, the first light emitting apparatus to work includes: When the first temperature value is greater than a preset temperature value, the vehicle controls the first light emitting apparatus to work in a third working mode; or when the first temperature value is less than a preset temperature value, the vehicle controls the first light emitting apparatus to work in a fourth working mode, where the third working mode and the fourth working mode are different working modes.

Optionally, that the vehicle controls the first light emitting apparatus to work includes: When the first temperature value is greater than the preset temperature value, the vehicle controls the first light emitting apparatus to display a warm hue; or when the first temperature value is less than the preset temperature value, the vehicle controls the first light emitting apparatus to display a cool hue.

For example, as shown in FIG. 5A, when the temperature value detected by the temperature sensor of the driver area is greater than the preset temperature value, the vehicle may control the ambient light in the driver area to display the warm hue, so that the user can intuitively feel that the temperature in the driver area heats up.

Optionally, before the vehicle controls the first light emitting apparatus to work, the method further includes: The vehicle obtains user information of the user located in the first area; and obtains, based on the user information, light configuration information corresponding to the user information; and that the vehicle controls the first light emitting apparatus to work includes: The vehicle controls, based on the light configuration information, the first light emitting apparatus to work.

It should be understood that the light configuration information may be preset in the vehicle before delivery of the vehicle, or may be customized by the user. For example, the vehicle receives a setting instruction from the user, where the setting instruction includes a correspondence between different users and colors preferred by the users when the first temperature is lower than the preset temperature value. A user A prefers a blue ambient light when the first temperature is lower than the preset temperature value. A user B prefers a purple ambient light when the first temperature is lower than the preset temperature value.

Optionally, the sensor includes a temperature sensor, the first signal indicates a second temperature value, and before the vehicle controls, based on the first signal, the first light emitting apparatus to work, the method further includes: The vehicle detects an operation that a user located in the first area adjusts a temperature in the vehicle to a third temperature value; and that the vehicle controls, based on the first signal, the first light emitting apparatus to work includes: When the third temperature value is greater than the second temperature value or when the third temperature value is less than the second temperature value, the vehicle controls the first light emitting apparatus to work.

For example, as shown in FIG. 5B, the temperature sensor at the front passenger detects that a current temperature in the front passenger area is 25° C. and the vehicle detects an operation that the user adjusts the temperature in the front passenger area to 28° C. In this case, the vehicle may control the ambient light in the front passenger area to work in a second mode, so that the user intuitively feels a temperature adjustment intent of the user, thereby implementing a visual feedback of the corresponding user on cool and warm requirements, and helping improve user experience.

Optionally, the sensor includes a temperature sensor, the first signal indicates a second temperature value, and before the vehicle controls, based on the first signal, the first light emitting apparatus to work, the method further includes: The vehicle detects an operation that a user located in the first area adjusts a temperature in the vehicle to a third temperature value; and that the vehicle controls, based on the first signal, the first light emitting apparatus to work includes: When the third temperature value is greater than the second temperature value, the vehicle controls the first light emitting apparatus to work in a fifth working mode; or when the third temperature value is less than the second temperature value, the vehicle controls the first light emitting apparatus to work in a sixth working mode, where the fifth working mode and the sixth working mode are different working modes.

Optionally, that the vehicle controls the first interior light to work includes: When the third temperature value is greater than the second temperature value, the vehicle controls the first light emitting apparatus to display a warm hue; or when the third temperature value is less than the second temperature value, the vehicle controls the first light emitting apparatus to display a cool hue.

In an embodiment, when the third temperature value is greater than the second temperature value, the light emitting apparatus is controlled to display the warm hue, so that the user can intuitively feel that the current intent of the user is to heat up the temperature of the first area. When the third temperature value is less than the second temperature value, the light emitting apparatus is controlled to display the cool hue, so that the user can intuitively feel that the current intent of the user is to cool down the temperature of the first area.

Optionally, the sensor includes a cup holder temperature sensor, and that the vehicle obtains the first signal collected by the sensor in the first area includes: After detecting that a user places a cup in a cup holder located in the first area, the vehicle obtains the first signal collected by the cup holder temperature sensor, where the first signal indicates a fourth temperature value of liquid in the cup; and when the fourth temperature value is greater than a fifth temperature value or when the fourth temperature value is less than a fifth temperature value, the vehicle controls the first light emitting apparatus to work, where the fifth temperature is a temperature value of the liquid in the cup that is detected by the cup holder temperature sensor before the user places the cup in the cup holder.

For example, as shown in FIG. 11, the cup holder on the left side includes the cup holder temperature sensor, and before the user places the cup into the cup holder, a temperature detected by the cup holder temperature sensor is 25° C. After the user places the cup in the cup holder, a temperature detected by the cup holder temperature sensor is 50° C. In this way, the vehicle can control the cup holder ambient light on the left side to work in a third mode, so that the user intuitively feels that the temperature of the liquid in the cup heats up, thereby helping improve user experience.

Optionally, that the vehicle controls the first interior light to work includes: When the fourth temperature value is greater than the fifth temperature value, the vehicle controls the first light emitting apparatus to display a warm hue; or when the fourth temperature value is less than the fifth temperature value, the vehicle controls the first light emitting apparatus to display a cool hue.

In an embodiment, when the fourth temperature value is greater than the fifth temperature value, the first light emitting apparatus is controlled to display the warm hue, so that the user can intuitively feel that the temperature in the cup is higher than the temperature before the cup is placed, thereby avoiding a scald caused because the user in the vehicle touches the cup by mistake.

Optionally, the method further includes: If the fourth temperature value is greater than the fifth temperature value, in a process in which a temperature detected by the cup holder temperature sensor cools down from the fourth temperature to the fifth temperature, the vehicle controls a color of the first light emitting apparatus to change from deep to light; or if the fourth temperature value is less than the fifth temperature value, in a process in which a temperature detected by the cup holder temperature sensor heats up from the fourth temperature to the fifth temperature, the vehicle controls a color of the first light emitting apparatus to change from deep to light.

In an embodiment, in a process in which a hot drink cools or a cold drink heats up to a room temperature, the color of the light emitting apparatus may change from deep to light, and gradually restore, along with a temperature change, to a color corresponding to a room temperature. This helps the user intuitively feel a change process of the temperature of the liquid in the cup, thereby helping improve user experience.

Optionally, the first interior light is a cup holder ambient light.

Optionally, the first signal indicates position information of an object around a first vehicle door, and there is a correspondence between the first vehicle door and the first area; and that the vehicle controls, based on the first signal, the first light emitting apparatus to work includes: When the vehicle is in a stationary state and the position information of the object meets a preset condition, the vehicle controls the first light emitting apparatus to work in a seventh mode.

In an embodiment, when the vehicle is stationary and there is the object passing outside the vehicle, the light emitting apparatus can notify the user that there is the object passing through the vehicle door, thereby preventing the user from colliding with the object after the vehicle door is opened.

Optionally, before the vehicle controls the first light emitting apparatus to work in the seventh mode, the method further includes: The vehicle detects an operation that the user located in the first area is about to open a vehicle door.

Optionally, before the vehicle controls the first light emitting apparatus to work in the seventh mode, the method further includes: The vehicle detects that the first area includes the user.

In an embodiment, before controlling the first light emitting apparatus to work, the vehicle can first determine that the user exists in the first area. If no user exists, even if there is the object passing outside the vehicle, the vehicle can control the first light emitting apparatus not to turn on, thereby helping save power.

Optionally, the method further includes: When controlling the first light emitting apparatus to work in the seventh mode, the vehicle controls the first vehicle door to be locked.

In an embodiment, when there is the object passing through the vehicle door, the vehicle can further control the vehicle door to be locked, thereby avoiding a collision when the user cannot make a response by using the light emitting apparatus.

Optionally, the first light emitting apparatus includes a first interior light and a first exterior light, the seventh working mode includes a first sub-mode and a second sub-mode, and that the vehicle controls the first light emitting apparatus to work in a seventh mode includes: The vehicle controls the first interior light to work in the first sub-mode, and controls the first exterior light to work in the second sub-mode.

In an embodiment, the first sub-mode may notify the user inside the vehicle that there is the object passing outside the vehicle, so that the user inside the vehicle can be warned. The second sub-mode may notify the user outside the vehicle that the vehicle door is about to open, so that the user outside the vehicle can avoid in a timely manner. In this way, both passengers inside and outside the vehicle are warned, thereby preventing the user from colliding with the object after the vehicle door is opened.

Optionally, before the vehicle controls the first light emitting apparatus to work, the method further includes: The vehicle obtains user information of the user located in the first area; and obtains, based on the user information, light configuration information corresponding to the user information; and that the vehicle controls the first light emitting apparatus to work includes: The vehicle controls, based on the light configuration information, the first light emitting apparatus to work.

It should be understood that the light configuration information may be preset in the vehicle before delivery of the vehicle, or may be customized by the user. For example, the vehicle receives a setting instruction from the user. The setting instruction includes a correspondence between different users and pre-warning colors preferred by the users. A pre-warning color preferred a user A is red, and a pre-warning color preferred a user B is purple. In this case, when the vehicle detects that the user A located in the first area is about to get off the vehicle, if an object passes around, the light system may control the first light emitting apparatus in the first area to shine red, thereby achieving a pre-warning effect for the user A.

In an embodiment, before controlling the first light emitting apparatus to work, the vehicle can further first determine the user information, and determine the light configuration information based on the user information. The vehicle can store a correspondence between different users and light configuration information preferred by the users. In this way, the vehicle can select the light configuration information preferred by the user to control the light emitting apparatus to work. This is more compliant with a use habit of the user, thereby helping improve use experience of the user.

An embodiment further provides a vehicle light control method. The method is applied to a vehicle, the vehicle includes a plurality of areas, each of the plurality of areas includes at least one light emitting apparatus and at least one sensor of a first type, the plurality of areas include a first area, the first area includes a first light emitting apparatus and a first sensor, a type of the first sensor is the first type, the first light emitting apparatus includes a first interior light and a first exterior light, and the method includes: obtaining a first signal detected by the first sensor; and controlling, based on the first signal, the first interior light and the first exterior light to work.

In an embodiment, the vehicle can control, based on the first signal collected by the sensor located in the first area, the interior light and the exterior light located in the first area to work. This fully considers feelings of members in different areas of the vehicle, helps a user outside the vehicle learn a current state of the vehicle in a timely manner, and helps improve intelligence of the in-vehicle light system, thereby helping improve user experience.

Optionally, the first signal indicates that the vehicle is currently in an autonomous driving mode, and the controlling, based on the first signal, the first interior light and the first exterior light to work includes: controlling, based on the first signal, the first interior light to work in a first mode and controlling the first exterior light to work in a second working mode, where the first working mode notifies a user inside the vehicle that the vehicle is currently in the autonomous driving mode, and the second working mode notifies a user outside the vehicle that the vehicle is currently in the autonomous driving mode.

In an embodiment, when the vehicle is in the autonomous driving mode, the user inside the vehicle and the user outside the vehicle can be separately notified by using the interior light and the exterior light. This can warn some users who want to stay away from the autonomous driving vehicle.

Optionally, the method further includes: when detecting that the vehicle needs to be taken over by a driver, controlling the first interior light to switch from the first mode to a third mode to work.

In an embodiment, when the vehicle needs to be taken over by the user, the vehicle can control the light emitting apparatus to switch from the first mode to the third mode. In this way, the user inside the vehicle can be warned, so that the user can take over the vehicle in a timely manner, thereby improving driving security of the vehicle.

Optionally, the method further includes: when an autonomous driving level of the vehicle is degraded, controlling the first interior light to switch from the first mode to a third mode to work.

Optionally, the method further includes: controlling the first exterior light to stop working in the second mode.

Optionally, the first signal indicates position information of an object around a first vehicle door; and the controlling, based on the first signal, the first interior light and the first exterior light to work includes: when the vehicle is in a stationary state and the position information of the object meets a preset condition, controlling the first interior light to work in a third mode and controlling the first exterior light to work in a fourth working mode.

Optionally, before the controlling the first interior light to work in a third mode and controlling the first exterior light to work in a fourth working mode, the method further includes: detecting an operation that a user located in a first area is about to open a vehicle door, where there is a correspondence between the first area and the first vehicle door.

Optionally, before the controlling the first interior light to work in a third mode and controlling the first exterior light to work in a fourth working mode, the method further includes: detecting that the first area includes the user, where there is a correspondence between the first area and the first vehicle door.

Optionally, the method further includes: when the controlling the first interior light to work in a third mode and controlling the first exterior light to work in a fourth working mode, controlling the first vehicle door to be locked.

Optionally, before the controlling the first interior light to work in a third mode and controlling the first exterior light to work in a fourth working mode, the method further includes: obtaining user information of the user located in the first area, where there is a correspondence between the first area and the first vehicle door; and obtaining, based on the user information, light configuration information corresponding to the user information; and the controlling the first interior light to work in a third mode and controlling the first exterior light to work in a fourth working mode includes: based on the light configuration information, controlling the first interior light to work in the third mode and controlling the first exterior light to work in the fourth working mode.

Figure 23:
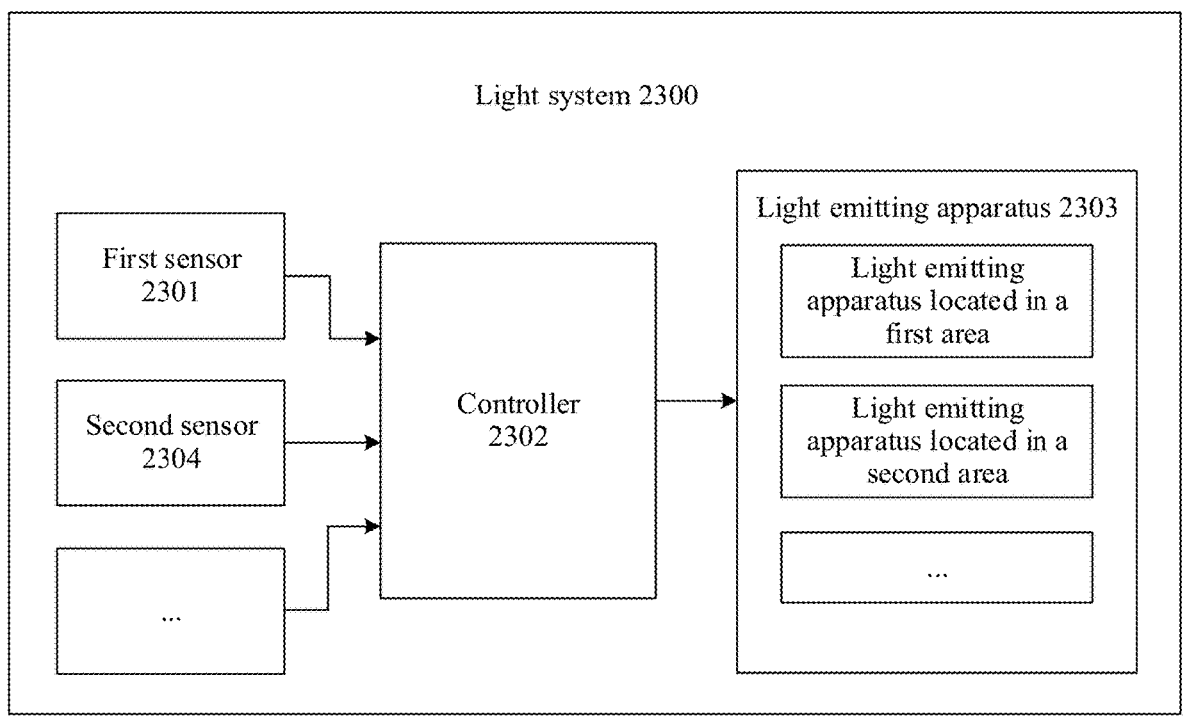
FIG. 23 is a schematic diagram of a structure of a light system according to an embodiment.

FIG. 23 is a schematic diagram of a structure of a light system 2300 according to an embodiment. The system 2300 is applied to a vehicle, the vehicle includes a plurality of areas, each of the plurality of areas includes at least one light emitting apparatus and at least one sensor of a first type, the plurality of areas include a first area, the light system includes a first sensor 2301 and a first light emitting apparatus 2303 that are located at the first area, a type of the first sensor is the first type, and the light system further includes a controller 2302.

The first sensor 2301 is configured to collect a first signal.

The first sensor 2301 is further configured to send the first signal to the controller.

The controller 2302 is configured to control, based on the first signal, the first interior light to work.

Optionally, as shown in FIG. 3, the controller 2302 may be an interior light controller (for example, an ambient light controller).

Optionally, as shown in FIG. 4, the controller 2302 may be a VIU.

Optionally, as shown in FIG. 4, the controller 2302 may include a VIU and a domain controller (for example, an MDC, a CDC, and a VDC).

Optionally, the controller 2302 is further configured to adjust an ambient light based on a sound, where the sound includes one or more of a user voice instruction, music played in the vehicle, and a sound made when a video is played in the vehicle.

Optionally, the sensor of the first type is a sound source positioning apparatus, and the first signal includes a sound signal and information about a sound source position; and the controller 2302 is further configured to: when the sound source position is located in the first area, control the first light emitting apparatus to work.

Optionally, the sensor of the first type is a sound collection apparatus, the plurality of areas further include a second area, the light system 2300 further includes a second sensor 2304 located in the second area, and a type of the second sensor 2304 is the first type. The second sensor 2304 is configured to collect a second signal, and the controller 2302 is further configured to: when determining, based on the first signal and the second signal, that a sound source is located in the first area, control the first light emitting apparatus to work.

Optionally, before controlling the first light emitting apparatus to work, the controller 2302 is further configured to: determine a speech recognition state based on the first signal; and the controller is further configured to: control, based on the speech recognition state, the first light emitting apparatus to work, where the speech recognition state includes one or more of a speech wakeup state, a speech listening state, a speech thinking state, and a speech execution state.

Optionally, the sensor of the first type is a sound collection apparatus, and the first sensor 2301 is further configured to: collect an audio signal; and the controller 2302 is further configured to: control, based on a first parameter of the audio signal, the first light emitting apparatus to work.

Optionally, the audio signal is music, and the first parameter includes one or more of a beat, a tune, lyric information, and album cover color information of the music.

Optionally, the audio signal is music, and the controller 2302 is further configured to: determine first information of the music based on the first parameter of the audio signal, where the first information includes one or more of a song name, a singer name, or a name of an album to which the music belongs; and control, based on a mapping relationship between the first information and a working mode of the light emitting apparatus, the first light emitting apparatus to work in a second mode.

Optionally, the sensor includes a temperature sensor, the first signal indicates a first temperature value, and the controller 2302 is further configured to: when the first temperature value is greater than a preset temperature value, control the first light emitting apparatus to work in a third working mode; or when the first temperature value is less than a preset temperature value, control the first light emitting apparatus to work in a fourth working mode, where the third working mode and the fourth working mode are different working modes.

Optionally, that the first light emitting apparatus is controlled to work in the third working mode includes that the first light emitting apparatus is controlled to display a first color; and that the first light emitting apparatus is controlled to work in a fourth working mode includes that the first light emitting apparatus is controlled to display a second color, where the first color is different from the second color.

Optionally, the first color is a warm hue, and the second color is a cool hue.

Optionally, the sensor includes a temperature sensor, the first signal indicates a second temperature value, and the controller 2302 is further configured to: before controlling, based on the first signal, the first light emitting apparatus to work, obtain an instruction, where the instruction instructs the vehicle to detect an operation that a user located in the first area adjusts a temperature in the vehicle to a third temperature value; and the controller is further configured to: when the third temperature value is greater than the second temperature value, control the first light emitting apparatus to work in a fifth working mode; or when the third temperature value is less than the second temperature value, control the first light emitting apparatus to work in a sixth working mode, where the fifth working mode and the sixth working mode are different working modes.

Optionally, that the first light emitting apparatus is controlled to work in the fifth working mode includes that the first light emitting apparatus is controlled to display a third color; and that the first light emitting apparatus is controlled to work in the sixth working mode includes that the first light emitting apparatus is controlled to display a fourth color, where the third color is different from the fourth color.

Optionally, the third color is a warm hue and the fourth color is a cool hue.

Optionally, the controller 2302 is further configured to obtain an instruction, where the instruction instructs the vehicle to detect that an air exhaust direction of an air outlet of an air conditioner located in the first area is a first direction; and the controller 2302 is further configured to control the first light emitting apparatus to be displayed in a water flowing light form, where the water flowing light form matches the first direction.

Optionally, the sensor includes a cup holder temperature sensor, and the first sensor 2301 is further configured to: collect the first signal after a user places a cup in a cup holder located in the first area, where the first signal indicates a fourth temperature value of liquid in the cup; and the controller 2302 is further configured to: when the fourth temperature value is greater than a fifth temperature value, control the first light emitting apparatus to display a warm hue; or when the fourth temperature value is less than a fifth temperature value, control the first light emitting apparatus to display a cool hue, where the fifth temperature is a temperature value of the liquid in the cup that is detected by the cup holder temperature sensor before the user places the cup in the cup holder.

Optionally, the controller 2302 is further configured to: if the fourth temperature value is greater than the fifth temperature value, in a process in which a temperature detected by the cup holder temperature sensor cools down from the fourth temperature to the fifth temperature, control a color of the first light emitting apparatus to change from deep to light; or if the fourth temperature value is less than the fifth temperature value, in a process in which a temperature detected by the cup holder temperature sensor heats up from the fourth temperature to the fifth temperature, control a color of the first light emitting apparatus to change from deep to light.

Optionally, the first light emitting apparatus 2303 is a cup holder ambient light.

Optionally, the first signal indicates position information of an object around a first vehicle door, and there is a correspondence between the first vehicle door and the first area; and the controller 2302 is further configured to: when the vehicle is in a stationary state and the position information of the object meets a preset condition, control the first light emitting apparatus to work in a seventh mode.

Optionally, the controller 2302 is further configured to obtain an instruction before controlling the first light emitting apparatus to work in the seventh mode, where the instruction instructs the vehicle to detect an operation that the user located in the first area is about to open a vehicle door.

Optionally, the controller is further configured to: before controlling the first light emitting apparatus to work in the seventh mode, obtain an instruction, where the instruction instructs a vehicle to detect that the first area includes the user.

Optionally, the controller 2302 is further configured to: When controlling the first light emitting apparatus to work in the seventh mode, control the first vehicle door to be locked.

Optionally, the first light emitting apparatus 2303 includes a first interior light and a first exterior light, the seventh working mode includes a first sub-mode and a second sub-mode, and the controller 2302 is further configured to: control the first interior light to work in the first sub-mode, and control the first exterior light to work in the second sub-mode.

Optionally, before controlling the first light emitting apparatus to work, the controller 2302 is further configured to: obtain user information of the user located in the first area; and obtain, based on the user information, light configuration information corresponding to the user information; and the controller 2302 is further configured to: control, based on the light configuration information, the first light emitting apparatus to work.

In an embodiment, a light system is provided. The light system is applied to a vehicle, the vehicle includes a plurality of areas, each of the plurality of areas includes at least one light emitting apparatus and at least one sensor of a first type, the plurality of areas include a first area, the light system includes a first light emitting apparatus and a first sensor that are located in the first area, a type of the first sensor is the first type, the first light emitting apparatus includes a first interior light and a first exterior light, and the light system further includes a controller. The first sensor is configured to collect a first signal, and the controller is configured to control, based on the first signal, the first interior light and the first exterior light to work.

Optionally, the first signal indicates that the vehicle is currently in an autonomous driving mode, and the controller is further configured to: control, based on the first signal, the first interior light to work in a first mode and control the first exterior light to work in a second working mode, where the first working mode notifies a user inside the vehicle that the vehicle is currently in the autonomous driving mode, and the second working mode notifies a user outside the vehicle that the vehicle is currently in the autonomous driving mode.

Optionally, the controller is further configured to: obtain an instruction, where the instruction indicates that the vehicle needs to be taken over by a driver; and control, in response to the obtained instruction, the first interior light to switch from the first mode to a third mode to work.

Optionally, the controller is further configured to: control the first exterior light to stop working in the second mode.

Optionally, the first signal indicates position information of an object around a first vehicle door; and the controller is further configured to: when the vehicle is in a stationary state and the position information of the object meets a preset condition, control the first interior light to work in a third mode and control the first exterior light to work in a fourth working mode.

Optionally, the controller is further configured to obtain an instruction before controlling the first interior light to work in the third mode and controlling the first exterior light to work in the fourth working mode, where the instruction instructs the vehicle to detect an operation that a user located in a first area is about to open a vehicle door, and there is a correspondence between the first area and the first vehicle door.

Optionally, the controller is further configured to obtain an instruction before controlling the first interior light to work in the third mode and controlling the first exterior light to work in the fourth working mode, where the instruction instructs the vehicle to detect that the first area includes the user, and there is a correspondence between the first area and the first vehicle door.

Optionally, the controller is further configured to: when controlling the first interior light to work in the third mode and controlling the first exterior light to work in the fourth working mode, controlling the first vehicle door to be locked.

Optionally, the controller is further configured to: before controlling the first interior light to work in the third mode and controlling the first exterior light to work in the fourth working mode, obtain user information of the user located in the first area, where there is a correspondence between the first area and the first vehicle door; and obtain, based on the user information, light configuration information corresponding to the user information; and the controller is further configured to: based on the light configuration information, control the first interior light to work in the third mode and control the first exterior light to work in the fourth working mode.

Figure 24:
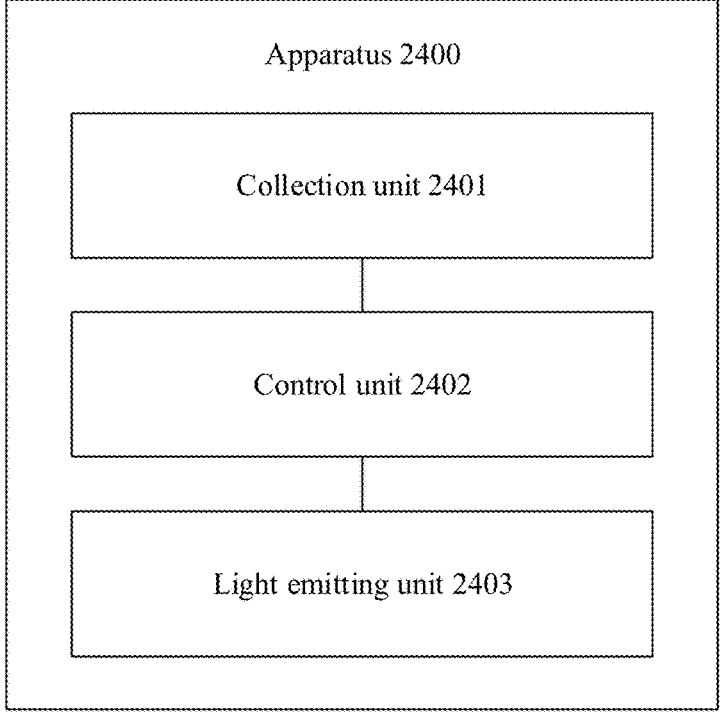
FIG. 24 is a schematic block diagram of an apparatus according to an embodiment.

FIG. 24 is a schematic block diagram of an apparatus 2400 according to an embodiment. The apparatus 2400 is applied to a vehicle, the vehicle includes a plurality of areas, each of the plurality of areas includes at least one light emitting unit and at least one collection apparatus of a first type, the plurality of areas include a first area, a light system includes a collection unit 2401 and a first light emitting unit 2403 that are located in the first area, a type of the first sensor is the first type, and the apparatus 2400 further includes a control unit 2402. The collection unit 2401 is configured to collect a first signal in the first area; and the control unit 2402 is configured to control, based on the first signal, the first light emitting unit 2403 to work.

An embodiment further provides a vehicle including the in-vehicle light system 2300 or the apparatus 2400.

An embodiment further provides an interior light control apparatus. The apparatus includes a processing unit and a storage unit. The storage unit is configured to store instructions. The processing unit executes the instructions stored in the storage unit, so that the apparatus performs the foregoing interior light control method.

Optionally, the processing unit may be the processor 113 shown in FIG. 1, and the storage unit may be the memory 114 shown in FIG. 1. The memory 114 may be a storage unit (for example, a register or a cache) in a chip, or may be a storage unit located outside the chip in a vehicle (for example, a read-only memory (ROM, or a random-access memory (RAM)).

An embodiment further provides a computer program product. The computer program product includes computer program code. When the computer program code is run on a computer, the computer is enabled to perform the foregoing interior light control method.

An embodiment further provides a computer-readable medium. The computer-readable medium stores program code. When the computer program code is run on a computer, the computer is enabled to perform the foregoing interior light control method.

In an implementation process, steps of the foregoing methods may be implemented by using a hardware integrated logic circuit in the processor 113 or by using instructions in a form of software. Methods disclosed with reference to embodiments may be directly executed and accomplished by using a hardware processor, or may be executed and accomplished by using a combination of hardware and software modules in the processor 113. A software module may be located in a mature storage medium in the art, like a random access memory, a flash memory, a read-only memory, a programmable read-only memory, an electrically erasable programmable memory, or a register. The storage medium is located in the memory, and the processor 113 reads information in the memory 114 and completes the steps in the foregoing methods in combination with hardware of the processor. To avoid repetition, details are not described herein again.

It should be understood that, the processor 113 in embodiments may be a central processing unit (CPU). The processor 113 may be another general purpose processor, a digital signal processor (DSP), an application-specific integrated circuit (ASIC), a field-programmable gate array (FPGA), or another programmable logic device, discrete gate or transistor logic device, discrete hardware component, or the like. The general-purpose processor may be a microprocessor, or the processor may be any conventional processor or the like.

It should also be understood that in embodiments, the memory 114 may include a read-only memory and a random access memory, and provide instructions and data to the processor.

In embodiments, "first", "second", and various numeric numbers are merely used for distinguishing for ease of description and are not intended to limit the scope of embodiments. For example, "first", "second", and various numeric numbers are used for distinguishing between different pipes, through holes, and the like.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments, sequence numbers of the foregoing processes do not mean execution sequences. The execution sequences of the processes should be determined based on functions and internal logic of the processes, and should not constitute any limitation to implementation processes of embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate parts may or may not be physically separate, and parts displayed as units may or may not be physical units, that is, they may be located in one position, or may be distributed on a plurality of network units. Some or all of the units may be selected according to actual requirements to achieve the objective of the solutions of embodiments.

In addition, each functional unit in embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on this understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments. The foregoing storage medium includes any medium that can store program code, like a USB flash drive, a removable hard disk drive, a ROM, a RAM, a magnetic disk, or an optical disc.

The foregoing descriptions are merely specific implementations of this, but are not intended to limit the protection scope of this disclosure. Any variation or replacement readily figured out by a person skilled in the art within the technical scope disclosed shall fall within the protection scope of this disclosure. Therefore, the protection scope of this disclosure shall be subject to the protection scope of the claims.

What is claimed is:

1. A method comprising:
obtaining a first signal from a first sensor in a first area of a vehicle;
obtaining image information from a camera;
determining, based on the image information, that a first user is present in the first area;
determining first user information corresponding to the first user;

obtaining, from stored correspondences between user informations and light configuration informations, a first light configuration information corresponding to the first user information; and
controlling, based on the first signal and the first light configuration information, a first light-emitting apparatus in the first area to work.

2. The method of claim 1, wherein the first sensor comprises a temperature sensor, wherein the first signal indicates a temperature value, and wherein controlling the first light-emitting apparatus to work comprises:
controlling, when the temperature value is greater than a preset temperature value, the first light-emitting apparatus to work in a first working mode; and
controlling, when the temperature value is less than the preset temperature value, the first light-emitting apparatus to work in a second working mode.

3. The method of claim 2, wherein the first working mode comprises displaying a first color, and wherein the second working mode comprises displaying a second color.

4. The method of claim 3, wherein the first color has a warm hue and the second color has a cool hue.

5. The method of claim 1, wherein the first sensor comprises a temperature sensor, wherein the first signal indicates a first temperature value, wherein the method further comprises detecting adjustment of a vehicle temperature to a second temperature value, and wherein controlling the first light-emitting apparatus to work comprises:
controlling, when the second temperature value is greater than the first temperature value, the first light-emitting apparatus to work in a first working mode; and
controlling, when the second temperature value is less than the first temperature value, the first light-emitting apparatus to work in a second working mode.

6. The method of claim 5, wherein the first working mode comprises displaying a first color, and wherein the second working mode comprises displaying a second color.

7. The method of claim 6, wherein the first color has a warm hue and the second color has a cool hue.

8. The method of claim 5, further comprising controlling, when detecting adjustment of the vehicle temperature to a third temperature value, an air exhaust direction of an air outlet of an air conditioner located in the first area to be in a first direction, and wherein controlling the first light-emitting apparatus to work comprises controlling the first light-emitting apparatus to be displayed in a water flowing light form that matches the first direction.

9. The method of claim 1, wherein the first sensor comprises a cup holder temperature sensor, wherein the method further comprises further obtaining the first signal after detecting that the first user places a cup in a cup holder located in the first area, wherein the first signal indicates a first temperature value of a liquid in the cup, and wherein the controlling the first light-emitting apparatus to work comprises:
controlling, when the first temperature value is greater than a second temperature value of the liquid before the first user places the cup in the cup holder, the first light-emitting apparatus to display a warm hue; and
controlling, when the first temperature value is less than the second temperature value, the first light-emitting apparatus to display a cool hue.

10. The method of claim 9, further comprising:
controlling, while a cup holder temperature detected by the cup holder temperature sensor cools down from the first temperature value to the second temperature value, a color of the first light-emitting apparatus to change from deep to light; and controlling, while the cup holder temperature heats up from the first temperature value to the second temperature value, the color to change from deep to light.

11. The method of claim 9, wherein the first light-emitting apparatus is a cup holder ambient light.

12. A light system comprising:

a memory configured to store instructions; and at least one processor coupled to the memory and configured to execute the instructions to cause the light system to:

obtain a first signal from a first sensor in a first area of a vehicle;

obtain image information from a camera;

determine, based on the image information, that a first user is present in the first area;

determine first user information corresponding to the first user;

obtain, from stored correspondences between user informations and light configuration informations, a first light configuration information corresponding to the first user information; and control, based on the first signal and the first light configuration information, a first light-emitting apparatus in the first area to work.

13. The light system of claim 12, wherein the first sensor comprises a temperature sensor, wherein the first signal indicates a temperature value, and wherein the at least one processor is further configured to execute the instructions to cause the light system to further control the first light-emitting apparatus to work by:

controlling, when the temperature value is greater than a preset temperature value, the first light-emitting apparatus to work in a first working mode; and controlling, when the temperature value is less than the preset temperature value, the first light-emitting apparatus to work in a second working mode.

14. The light system of claim 13, wherein the first working mode comprises displaying a first color, and wherein the second working mode comprises displaying a second color.

15. The light system of claim 14, wherein the first color has a warm hue and the second color has a cool hue.

16. The light system of claim 12, wherein the first sensor comprises a temperature sensor, wherein the first signal indicates a first temperature value, wherein the at least one processor is further configured to execute the instructions to cause the light system to:

detect adjustment of a vehicle temperature to a second temperature value; and further control the first light-emitting apparatus to work by:

controlling, when the second temperature value is greater than the first temperature value, the first light-emitting apparatus to work in a first working mode; and controlling, when the second temperature value is less than the first temperature value, the first light-emitting apparatus to work in a second working mode.

17. The light system of claim 16, wherein the first working mode comprises displaying a first color, and wherein the second working mode comprises displaying a second color.

18. The light system of claim 17, wherein the first color has a warm hue and the second color has a cool hue.

19. The light system of claim 16, wherein the at least one processor is further configured to execute the instructions to cause the light system to:

control, when detecting adjustment of the vehicle temperature to a third temperature value, an air exhaust direction of an air outlet of an air conditioner located in the first area to be in a first direction; and further control the first light-emitting apparatus to work by controlling the first light-emitting apparatus to be displayed in a water flowing light form that matches the first direction.

20. A computer program product comprising instructions that are stored on a computer-readable medium and that, when executed by at least one processor, cause a light system to:

obtain a first signal from a first sensor in a first area of a vehicle;

obtain image information from a camera;

determine, based on the image information, that a first user is present in the first area;

determine first user information corresponding to the first user;

obtain, from stored correspondences between user informations and light configuration informations, a first light configuration information corresponding to the first user information; and control, based on the first signal and the first light configuration information, a first light-emitting apparatus in the first area to work.

* * * * *